(12) United States Patent
Morishige et al.

(10) Patent No.: US 11,336,911 B2
(45) Date of Patent: May 17, 2022

(54) IMAGE DATA PROCESSING METHOD

(71) Applicant: AXELL CORPORATION, Tokyo (JP)

(72) Inventors: Takashi Morishige, Tokyo (JP); Kazuki Kyakuno, Tokyo (JP); Wataru Yokozeki, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 0 days.

(21) Appl. No.: 16/934,605

(22) Filed: Jul. 21, 2020

(65) Prior Publication Data

US 2020/0351510 A1 Nov. 5, 2020

Related U.S. Application Data

(63) Continuation of application No. 16/467,541, filed as application No. PCT/JP2017/043285 on Dec. 1, 2017, now Pat. No. 10,944,980.

(30) Foreign Application Priority Data

Dec. 9, 2016 (JP) .................................. 2016-239477
Nov. 27, 2017 (JP) ............................. JP2017-226709

(51) Int. Cl.
*H04N 5/93* (2006.01)
*H04N 5/92* (2006.01)
(Continued)

(52) U.S. Cl.
CPC ............... *H04N 19/44* (2014.11); *H04N 9/89* (2013.01); *H04N 19/42* (2014.11)

(58) Field of Classification Search
USPC ........................ 386/278, 283, 329, 326, 343
See application file for complete search history.

(56) References Cited

U.S. PATENT DOCUMENTS 6,924,846 B2 * 8/2005 Ohba ................. H04N 21/4307
348/584
2003/0048848 A1 3/2003 Li et al.
(Continued)

FOREIGN PATENT DOCUMENTS

JP 2012-191513 A 10/2012
JP 2017-225096 A 12/2017
(Continued)

OTHER PUBLICATIONS

International Search Report issued in PCT/JP2017/043285 dated Jan. 23, 2018 (5 pages).
(Continued)

*Primary Examiner* — Daquan Zhao
(74) *Attorney, Agent, or Firm* — Osha Bergman Watanabe & Burton LLP

(57) ABSTRACT

Provided is an image data processing method for preventing decrease of a decoding processing capability of an image processing device even if the image processing device is included in a game machine on which many moving pictures having low resolutions are displayed. First, decoding processing is designed (step S1). For example, it is designed in such a manner that a moving picture X is singly processed and that a moving picture Y and a moving picture Z having low vertical resolutions can be combined together to be subjected to decoding processing. Subsequently, each of the moving picture X, the moving picture Y, and the moving picture Z is encoded (step S2). Next, encoded data of the moving picture X is singly decoded, and the moving picture X is restored and displayed on a display unit of the image processing device at a predetermined timing. Meanwhile, respective pieces of encoded data of the moving picture Y and the moving picture Z are combined together and are decoded depending on respective display timings, and the moving picture X and the moving picture Y are restored and (Continued)

further separated from each other to be displayed on the display unit at the respective timings (step S3).

6 Claims, 22 Drawing Sheets

(51) Int. Cl.
*H04N 19/42* (2014.01)
*G11B 27/00* (2006.01)
*H04N 19/44* (2014.01)
*H04N 9/89* (2006.01)
*H04N 19/85* (2014.01)

(56) References Cited

U.S. PATENT DOCUMENTS

| | | | |
|---|---|---|---|
| 2006/0133509 A1* | 6/2006 | Schwartz | H04N 19/18 375/240.18 |
| 2008/0165277 A1 | 7/2008 | Loubachevskaia et al. | |
| 2009/0067507 A1 | 3/2009 | Baird et al. | |
| 2013/0215016 A1 | 8/2013 | Moriyoshi | |
| 2013/0343663 A1 | 12/2013 | Sato | |
| 2014/0294080 A1 | 10/2014 | Kurihara | |
| 2015/0319452 A1* | 11/2015 | Lewis | H04N 19/136 375/240.12 |
| 2016/0261880 A1 | 9/2016 | Lee et al. | |

FOREIGN PATENT DOCUMENTS

| | | |
|---|---|---|
| WO | 01/56293 A1 | 8/2001 |
| WO | 2009/035936 A1 | 3/2009 |
| WO | 2012/060459 A1 | 5/2012 |
| WO | 2015/058719 A1 | 4/2015 |
| WO | 2015/168150 A1 | 11/2015 |

OTHER PUBLICATIONS

Written Opinion of the International Searching Authority issued in PCT/JP2017/043285 dated Jan. 23, 2018 (6 pages).
Extended European Search Report in counterpart European Application No. 17879606.6 dated Mar. 13, 2020 (10 pages).
Office Action issued in U.S. Appl. No. 16/467,541; dated Aug. 26, 2020 (15 pages).

* cited by examiner

FIG.9(a)
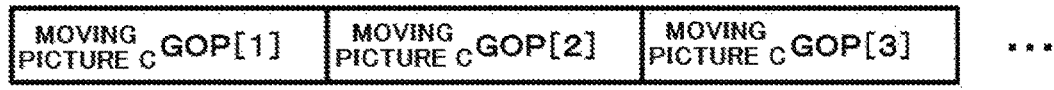
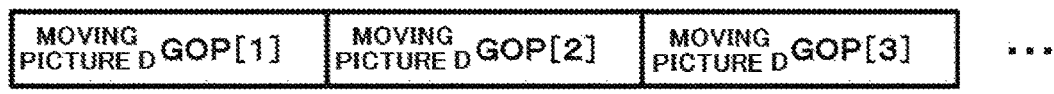
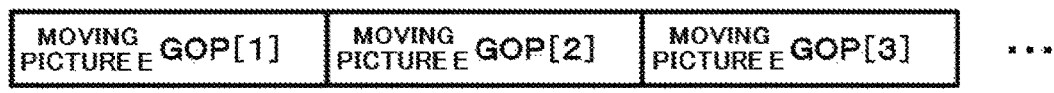
FIG.9(b)
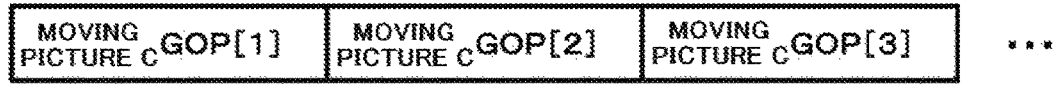
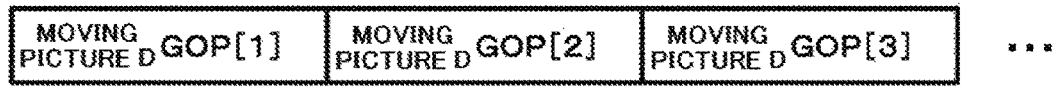
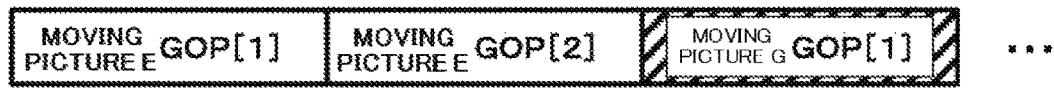

FIG.13(a)  BITSTREAM AFTER COMBINATION AT TIME t8
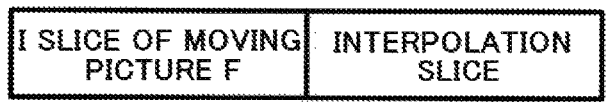
FIG.13(b)  PICTURE CONFIGURATION FROM t8 to t9
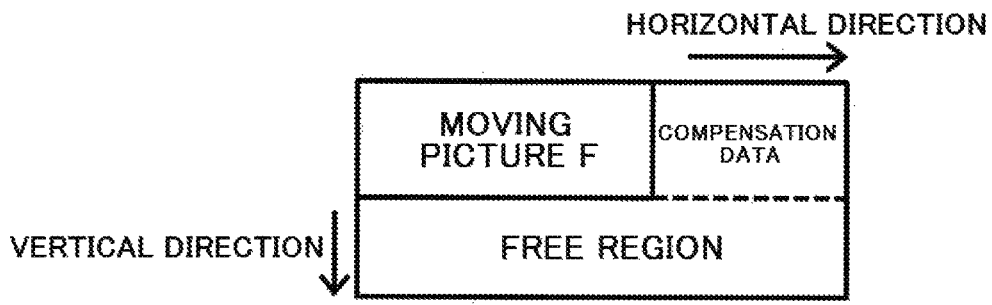
FIG.13(c)  BITSTREAM AFTER COMBINATION AT TIME t9
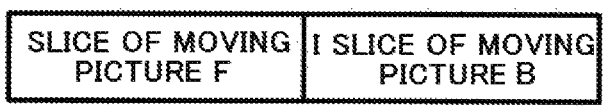
FIG.13(d)  PICTURE CONFIGURATION FROM t9 to t10
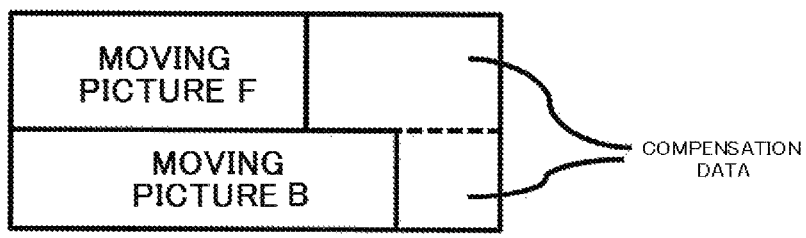
FIG.13(e)  BITSTREAM AFTER COMBINATION AT TIME t10
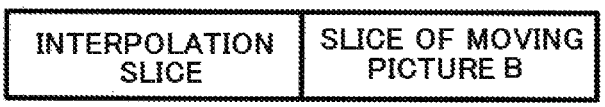
FIG.13(f)  PICTURE CONFIGURATION AFTER t10
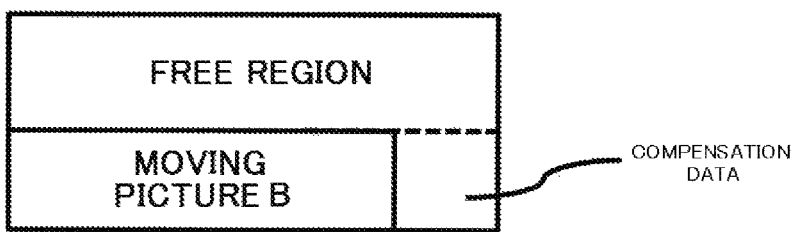

FIG.14(a)  BITSTREAM AFTER COMBINATION AT TIME t1

| I SLICE OF MOVING PICTURE C | INTERPOLATION SLICE | INTERPOLATION SLICE |

FIG.14(b)  PICTURE CONFIGURATION FROM t1 to t2

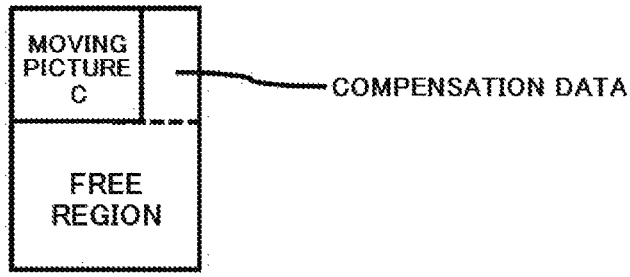

FIG.14(c)  BITSTREAM AFTER COMBINATION AT TIME t2

| SLICE OF MOVING PICTURE C | I SLICE OF MOVING PICTURE D | INTERPOLATION SLICE |

FIG.14(d)  PICTURE CONFIGURATION FROM t2 to t3

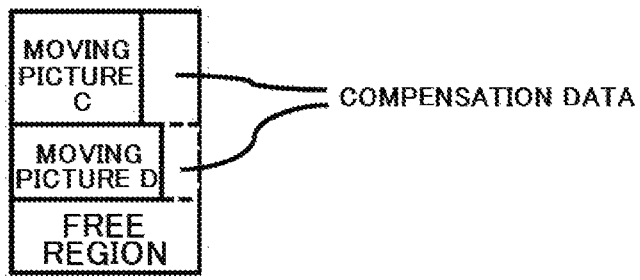

FIG.14(e)  BITSTREAM AFTER COMBINATION AT TIME t3

| SLICE OF MOVING PICTURE C | SLICE OF MOVING PICTURE D | I SLICE OF MOVING PICTURE E |

FIG.14(f)  PICTURE CONFIGURATION FROM t3 to t4

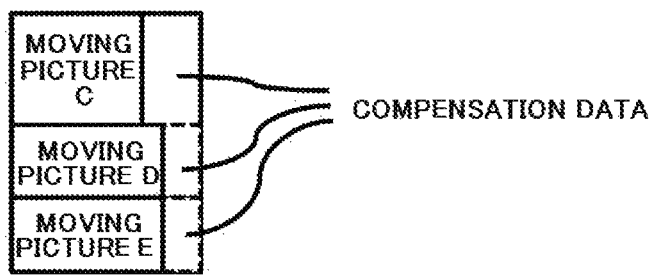

FIG. 15(a)  BITSTREAM AFTER COMBINATION AT TIME t4

| SLICE OF MOVING PICTURE C | TEMPORARILY STOP INTERPOLATION SLICE | SLICE OF MOVING PICTURE E |

FIG. 15(b)  PICTURE CONFIGURATION FROM t4 to t5

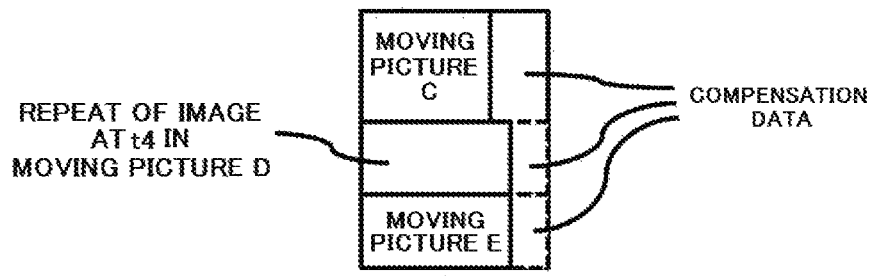

FIG. 15(c)  BITSTREAM AFTER COMBINATION AT TIME t5

| SLICE OF MOVING PICTURE C | REPRODUCTION RESUME OF MOVING PICTURE D IMAGE SLICE | SLICE OF MOVING PICTURE E |

FIG. 15(d)  PICTURE CONFIGURATION FROM t5 to t6

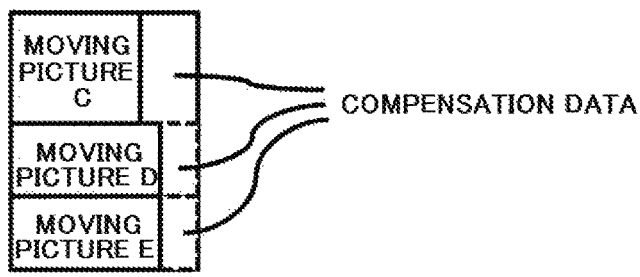

FIG. 15(e)  BITSTREAM AT TIME t6

| COMPENSATION DATA | SLICE OF MOVING PICTURE D | SLICE OF MOVING PICTURE E |

FIG. 15(f)  PICTURE CONFIGURATION FROM t6 to t7

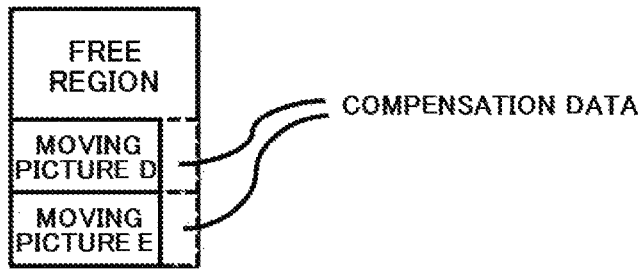

FIG.16(a)  BITSTREAM AFTER COMBINATION AT TIME t7
FIG.16(b)  PICTURE CONFIGURATION IMMEDIATELY AFTER TIME t7
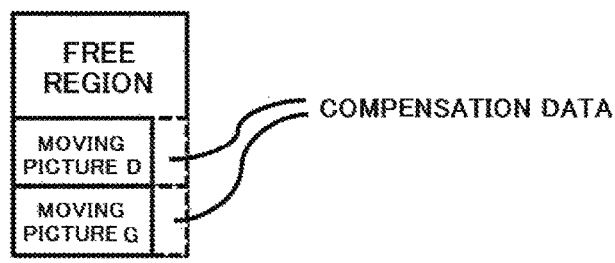
FIG.16(a)'  BITSTREAM AFTER COMBINATION AT TIME t7
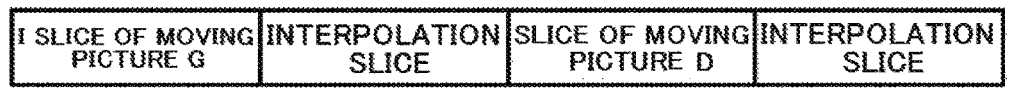
FIG.16(b)'  PICTURE CONFIGURATION FROM t5 to t6
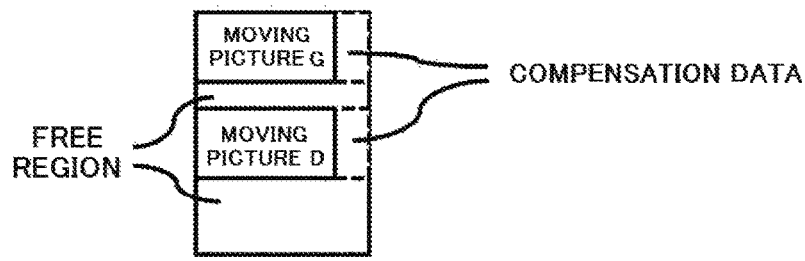

FIG.17(a) ANY POINT OF TIME FROM t3 to t4
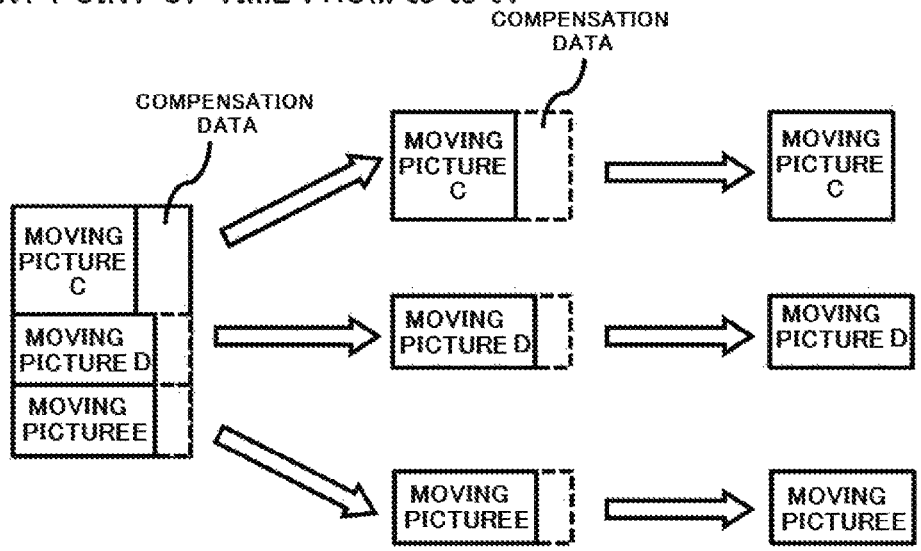
FIG.17(b) ANY POINT OF TIME FROM t4 to t5
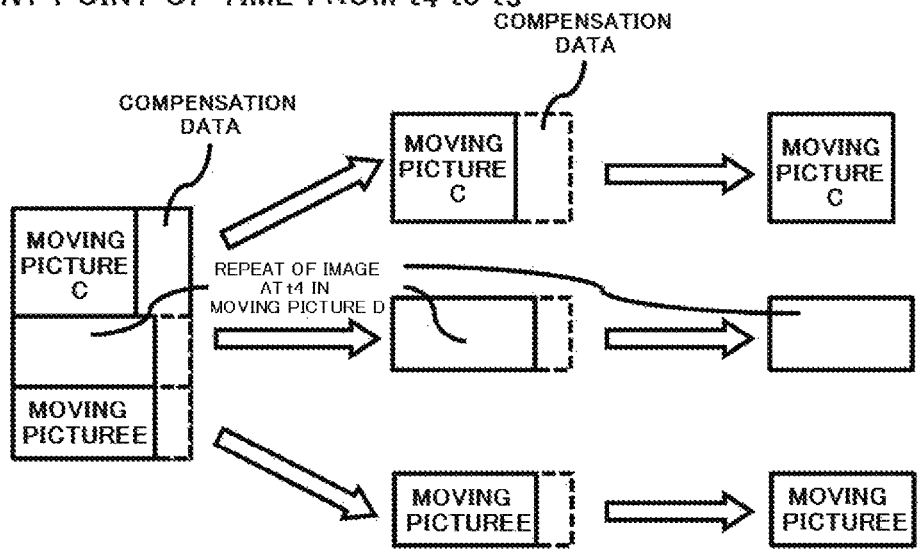
FIG.17(c) ANY POINT OF TIME FROM t6 to t7
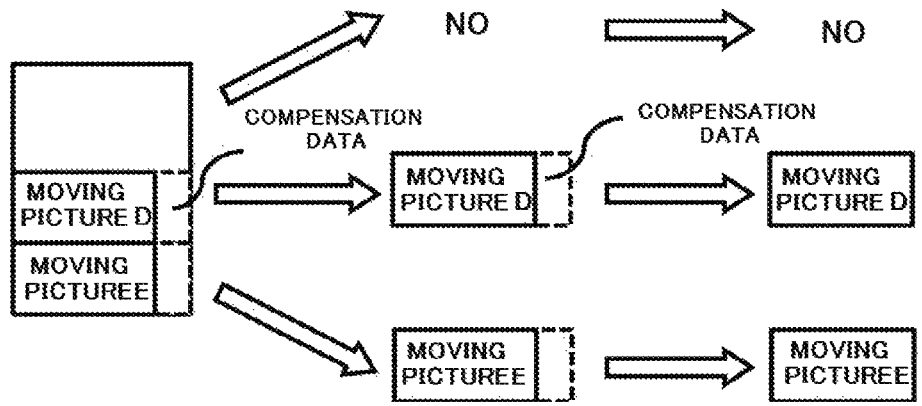

IMAGE DATA PROCESSING METHOD

FIELD

The present invention relates to an image data processing method, and more particularly relates to an image data processing method in a case of using an image processing device that displays many moving pictures having low resolutions while the moving pictures are subjected to decoding processing by a hardware decoder.

BACKGROUND

In moving picture reproduction processing in current various information appliances, encoded moving picture information having been previously encoded and stored is read from a storage medium or downloaded via a network from the viewpoint of the capacity, and the obtained information is decoded by decoding processing corresponding to the encoding and is supplied to a display device, so that moving pictures are reproduced on a liquid crystal device or the like.

Because there is enough time to perform the encoding processing, the encoding processing can be achieved by software. However, in the decoding processing, a hardware circuit, particularly a dedicated image processing processor is generally used to secure reproduction of moving pictures without delay even if the moving pictures are high-definition moving pictures.

That is, a configuration is applied in which a higher-order processing control unit provides only an instruction of processing to the dedicated image processing processor and the image processing processor thereafter autonomously performs image processing to increase the efficiency of the image processing.

FIG. 18 is a diagram illustrating a configuration of a conventional image processing device A, in which 100 denotes a high-order CPU that controls the entire image processing device, 200 denotes an image data ROM, 300 denotes an image processing processor, and 400 denotes a display unit. The image data ROM 200 has stored therein, for example, one or more pieces of moving picture information encoded based on a H.264 (MPEG-4/AVC) standard. While the image processing device A includes the image data ROM being a storage unit for encoded moving picture information, a configuration to download encoded moving picture information from a server on a network, or the like, can alternatively be applied.

The high-order CPU 100 issues a processing instruction which is generally called "API (Application Program Interface)" to the image processing processor 300. A unique API is provided from a software platform adopted by each device. For example, DXVA2 (DirectX Video Acceleration 2) is provided as an API when a device operates based on Windows as the operating system (OS) and VDPAU (Video Decode and Presentation API for Unix) is provided as an API when the OS is Linux®.

The high-order CPU 100 reads necessary encoded image data, which is desired to be displayed on the display unit 400 at a predetermined timing, from the image data ROM 200. Next, the high-order CPU 100 transmits the encoded image data along with an instruction on display (including a display timing, a display position, and the like) to the image processing processor 300. The image processing processor 300 having received this instruction and the corresponding encoded image data performs decoding processing corresponding to the encoding processing using an internal hardware decoder (not illustrated) to restore the original image. When the image processing processor 300 supplies the decoded image data to the display unit 400, the moving picture is reproduced on a liquid crystal screen or the like of the display unit 400.

H.264 being a standard for moving picture information stored in the image data ROM 200 is briefly explained next. In MPEG-2 or MPEG-4 (except for AVC), the hierarchical structure of a syntax is defined and information is arranged in a bitstream according to the hierarchical structure. In contrast thereto, in H.264, arrangement of parameter sets and slices that refer to the parameter sets is less restricted than in the standards such as MPEG-2.

The parameter sets include an SPS (Sequence Parameter Set) in which information associated with encoding of the entire sequence is stored, a PPS (Picture Parameter Set) indicating an encoding mode of the entire picture, and SEI (Supplemental Enhancement Information) that enables encoding of any information. Because the parameter sets such as the SPS and the PPS can be arranged for each frame in H.264, a plurality of sequences can be addressed in one bitstream.

FIG. 19 is a diagram illustrating a general bitstream of encoded data of an image that is encoded on the basis of the H.264 standard. For convenience of explanations, the number of the SPSs and the number of the PPSs being parameter sets are assumed as one, respectively. A layer separated from a VCL (Video Coding Layer) and called as "NAL (Network Abstraction Layer)" is defined in the H.264 standard. In the H.264 standard, encoded data generated in the VCL or a parameter set can be handled as an NAL unit, and encoded data is referred to as "VCL NAL unit" and the SPS or the PPS is referred to as "non-VCL NAL unit".

Each slice being a VCL NAL unit has a header area where at least information on a first macroblock coordinate (first_mb_in_slice) of the own slice is stored. While a picture is the unit for encoding in MPEG-2 and the like, a slice is the unit for encoding in H.264. Therefore, for example, to parallelize processes, a picture can be divided into a plurality of slices to perform a process for each of the slices.

For example, Patent Literature 1 discloses a technique of handling one frame as a plurality of slices, that is, dividing one image into plural parts to be encoded as plural slices in order to improve efficiency in encoding of a motion vector. Patent Literature 2 discloses a video distribution system that uses a tile obtained by encoding an I picture that can be decoded without referring to other image information to correct the position in a frame of a tile read by a stream correcting unit, so that a view region of video can be freely set and the view region can also be interactively changed.

However, the conventional technique as represented by Patent Literature 1 divides each image of one moving picture into plural parts but does not encode each of a plurality of moving pictures to configure each encoded moving picture as a slice for the purpose of avoiding decrease of the efficiency in decoding processing in a case where a plurality of images having low resolutions are handled. The invention described in Patent Literature 2 is related to a technique of freely changing a view region of video and this conventional technique does not avoid decrease of the efficiency in decoding processing in a case where a plurality of images having low resolutions are handled either.

CITATION LIST

Patent Literatures

Patent Literature 1: Japanese Patent Application Laid-open No. 2012-191513
Patent Literature 2: International Publication No. WO2012/060459

SUMMARY

Technical Problem

Moving picture reproduction in a game machine such as a pachinko machine or a pachislot machine has characteristics significantly different from general moving picture reproduction reproducing one moving picture.

FIG. 20 are explanatory diagrams of moving picture reproduction in a game machine such as a pachinko machine or a pachislot machine. Specifically, as illustrated in FIG. 20(a), in a game machine such as a pachinko machine or a pachislot machine, moving pictures having resolutions of variable levels are respectively displayed on a plurality of freely-selected regions on one liquid crystal screen or the like.

As illustrated in FIG. 20(b), reproduction start time points and reproduction times of the moving pictures are different. In addition, some moving pictures, such as a moving picture D, are temporarily stopped in the middle for the purpose of delaying the display timings. Further, as the relation between a moving picture E and a moving picture G, there is also a mode in which the moving picture E is not reproduced to the end but is interrupted and reproduction of the moving picture G is started instead, according to the progress of a game. A hatched portion of an arrow in the moving picture E indicates a portion that is originally expected to be reproduced but is interrupted during reproduction.

Focusing on decoding processing for images having different resolutions by a hardware decoder, the processing performance is not constant regardless of the resolutions and depends on the resolutions. However, the processing time of the decoding is not determined in proportion to the resolution. For example, even if the resolution is halved, the processing time of the decoding is not halved.

FIG. 21 is a diagram illustrating a decode performance of a general-purpose hardware decoder. The horizontal axis represents the image resolution and the vertical axis represents the processing performance (Gdps: Giga dot per sec). FIG. 21 also illustrates a decode performance in a case where the decoding processing is performed by software for a reference. Theoretically, the decode processing performances of a hardware decoder and a software decoder are both supposed not to vary according to the resolutions. However, as illustrated in FIG. 21, the processing performance attenuates proportionally as the resolution decreases in the software processing, and the processing performance reduces considerably as the resolution decreases in the hardware processing.

It is considered that the reason why the processing performance reduces considerably as the resolution decreases in the decoding processing by a hardware decoder as described above is that the hardware decoder performs parallel processing in units of a predetermined resolution in the vertical direction of an image.

FIG. 22 are explanatory diagrams of parallel processing in the vertical direction in a hardware decoder. FIG. 22(a) illustrates a case where a hardware decoder does not perform parallel processing and FIG. 22(b) illustrates a case where a hardware decoder performs parallel processing.

Generally, decoding processing is performed in units of a macroblock (MB) (16×16 pixels, for example). When parallel processing is not performed, one decoder core corresponding to one horizontal line of macroblocks decodes the macroblocks on that line sequentially as illustrated in FIG. 22(a). When intra prediction is adopted as in the H.264 standard, decoding is progressed row by row while information of surrounding predetermined macroblocks that have been already subjected to the decoding processing is referred to.

In contrast thereto, when a hardware decoder has a parallel processing function, the hardware decoder includes a plurality of decoder cores each corresponding to a plurality of macroblocks and the plural decoder cores each perform decoding processing on the plural macroblocks simultaneously and parallelly as illustrated in FIG. 22(b).

When intra prediction is adopted also in this case, the processing is typically progressed in a wavelike manner as illustrated in FIG. 22(b). Accordingly, such parallel processing is called "wave front parallel processing".

An image having a sufficiently high resolution in the vertical direction can sufficiently benefit from the parallel processing by plural hardware decoder cores as illustrated in FIG. 22(b). However, some images having low resolutions in the vertical direction cannot benefit from the parallel processing.

It is assumed, for example, that a macroblock consists of 16×16 pixels and eight hardware cores each being provided in a one-to-one relation with a macroblock are provided (FIG. 22(b) illustrates a case where there are five hardware cores as an example). The number of pixels in the vertical direction that are processed at one time is 128 (16 pixels× 8=128 pixels) and an image having a smaller number of pixels in the vertical direction than 128 pixels theoretically cannot benefit from the parallel processing.

As described above, when decoding processing of an image having a low resolution is performed, the degree of decrease in the processing performance depends on the number of decoder cores used in the parallel processing and the resolution of an image to be decoded. However, if a general-purpose hardware decoder that performs parallel processing with many decoder cores is used for the purpose of quickly performing decoding processing of an image having a high resolution, the processing performance relatively decreases in a case where decoding processing of an image having a low resolution is performed, as compared to a case where an image having a high resolution is processed.

There is also reduction in the processing speed caused by an environment where an image having a low resolution is processed, in addition to decrease in the processing performance in a general-purpose hardware decoder supposing the parallel processing as described above. That is, an image having a low resolution and an image having a high resolution are the same in being one picture and processing for decoding one picture is always accompanied by associated processing such as initialization of the decoder, as well as encoding processing of image data itself.

Therefore, when a plurality of images having low resolutions are to be displayed on a game machine or the like, the associated processing such as initialization of a decoder performed to display the images increases according to the number of the images, resulting in degradation of apparent decoding processing performance.

From the reasons described above, a device that displays many moving pictures having low resolutions, especially parallelly, such as a game machine represented by a pachinko machine or a pachislot machine has a problem that the processing speed is considerably reduced.

The present invention has been achieved in view of circumstances described above and an object of the present invention is to provide an image data processing method for preventing decrease of a decoding processing capability of an image processing device even if the image processing device is included in a game machine on which many moving pictures having low resolutions are displayed.

Solution to Problem

In order to achieve the above object, the present invention provides an image data processing method using an image processing device that includes a high-order CPU that outputs encoded image data associated with a moving picture and issues an instruction associated with reproduction of the moving picture, an image processing processor that has a hardware decoder and decodes the encoded image data associated with the moving picture on the basis of the instruction to be input, and a display unit on which the moving picture is reproduced on the basis of image data decoded by the image processing processor, wherein in a case where a plurality of moving pictures are reproduced on the display unit on the basis of the instruction, the high-order CPU combines respective moving pictures at a level of slices being encoded image data to integrally configure encoded image data while considering the moving pictures as one picture of a plurality of slices, and supplies the encoded image data to the image processing processor, and the hardware decoder decodes the integrated encoded image data.

Advantageous Effects of Invention

According to the image data processing method of the present invention, when a plurality of moving pictures having low resolutions are to be reproduced, a high-order CPU combines the moving pictures at a slice level and generates encoded image data of one picture composed of a plurality of slices, and a hardware decoder decodes one picture of plural slices including plural moving pictures combined together. Therefore, processing such as initialization of the hardware decoder necessary for each reproduction of moving pictures is rendered unnecessary, and the decoding processing speed can be improved.

BRIEF DESCRIPTION OF DRAWINGS

FIGS. 9(a) and 9(b) are explanatory diagrams of a case in which a moving picture is interrupted to be switched to another moving picture.

FIGS. 13(a) to 13(f) are explanatory diagrams of processing in a pre-processing unit on the basis of specific examples.

FIGS. 14(a) to 14(f) are explanatory diagrams of processing in the pre-processing unit on the basis of specific examples.

FIGS. 15 (a) to 15(f) are explanatory diagrams of processing in the pre-processing unit on the basis of specific examples.

FIGS. 16(a), 16(b), 16(a)', and 16(b)' are explanatory diagrams of processing in the pre-processing unit on the basis of specific examples.

FIGS. 17(a) to 17(c) are explanatory diagrams of processing in the pre-processing unit on the basis of specific examples.

DESCRIPTION OF EMBODIMENTS

Embodiments of the present invention will be described below in detail with reference to the accompanying drawings. An outline of a first embodiment in an image data processing method according to the present invention is described first with reference to FIG. 1.

In brief, according to the present invention, processing of combining pieces of encoded image data of a plurality of moving pictures having low resolutions in the vertical direction, decoding the combined data, and separating original moving pictures from the resultant image data is performed to prevent decrease of the decoding processing capability even if there are many moving pictures having low resolutions in the vertical direction.

Figure 1A:
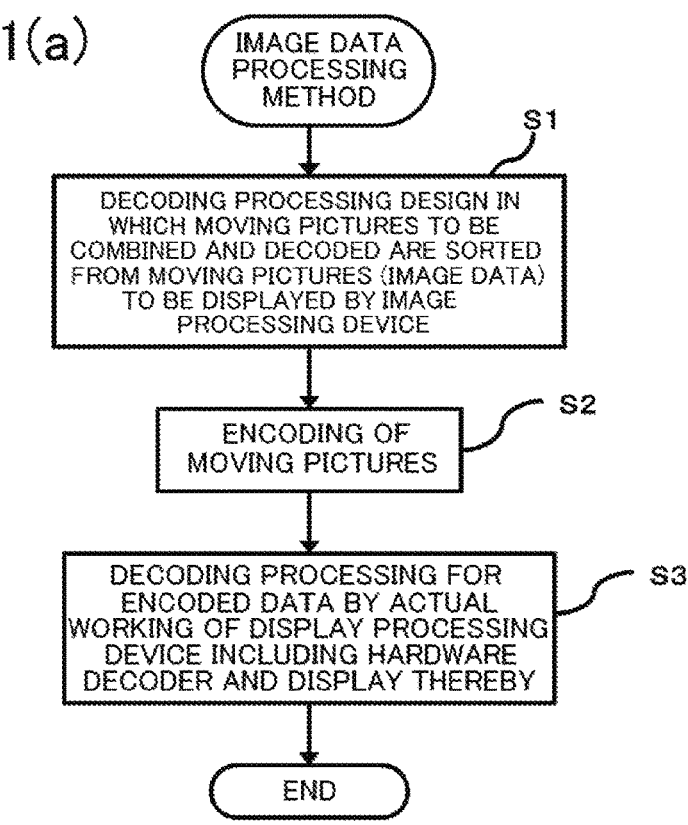
FIG. 1(a) is a flowchart for explaining an outline of an embodiment in an image data processing method according to the present invention.

More specifically, in FIG. 1(a), a designer of representation images first performs representation designing on which moving pictures are to be displayed at which timings on an image processing device (which is incorporated in a pachinko machine, for example) that performs display processing for predetermined moving pictures. At this time, the designer performs designing of decoding processing including sorting of moving pictures, on how a plurality of moving pictures among moving pictures displayed on the image processing device are to be combined together and be subjected to decoding processing (step S1). The representation designer is, for example, a person that determines moving pictures to be reproduced at the same time in certain representation on a game machine such as a pachinko machine.

Figure 1B:
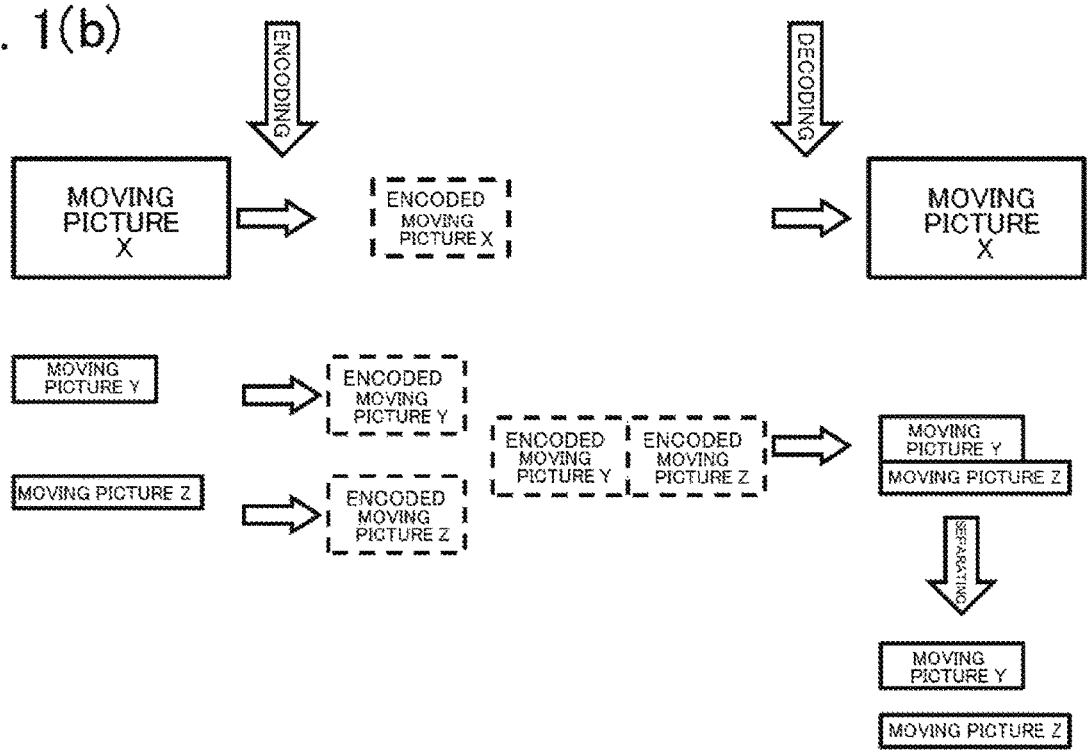
FIG. 1(b) is an explanatory diagram thereof.

The representation designer performs designing in such a manner that a moving picture X having a high vertical resolution is singly processed and a moving picture Y and a moving picture Z having low vertical resolutions can be combined together and be subjected to decoding processing as illustrated in FIG. 1(b). An encoder encodes each of the moving picture X, the moving picture Y, and the moving picture Z (step S2).

Next, a decoder decodes encoded data of the moving picture X singly, restores the moving picture X, and displays the restored moving picture X on a display unit of the image processing device at a predetermined timing. Meanwhile, the decoder combines encoded data of the moving picture Y and the moving picture Z together depending on respective display timings to decode the combined data, restores the moving picture Y and the moving picture Z, and further separates the moving pictures Y and Z from each other to display the moving pictures Y and Z on the display unit at the corresponding timings, respectively (step S3).

In the decoding processing design, the designer can use software that enables the designer to select moving pictures necessary for representation and input respective display timings thereof to sort out moving pictures to be combined together. Alternatively, a simultaneous reproduction processing capability of the image processing device can be input to software to enable control to select moving pictures that can be combined together based on the simultaneous reproduction processing capability.

A first embodiment in which the outline described above is more specified is explained below in detail including some predetermined conditions.

<Decoding design processing (step S1)>

To be examined from the viewpoint of the resolution, conditions for sorting out moving picture to be combined together at the time of decoding are as follows.
(1) The respective resolutions in the vertical direction of moving pictures to be combined together are equal to or lower than "the number of pixels" of parallel processing performed by a plurality of decoder cores.
(2) The total value of the respective resolutions in the vertical direction of the moving pictures to be combined together is higher than "the number of pixels" of the parallel processing performed by the decoder cores.
(3) However, the total value of the respective resolutions in the vertical direction of the moving pictures to be combined together does not exceed "the maximum resolution" in the vertical direction of the decoder.

The condition (1) indicates that an individual moving picture does not benefit from the parallel processing of plural decoder cores as explained in association with the conventional technique. The condition (2) indicates that, as a result of combination of plural moving pictures, the sum of the respective resolutions in the vertical direction exceeds the number of pixels of the parallel processing of plural decoder cores, so that the moving pictures benefit from the parallel processing. Further, the condition (3) indicates that a plurality of moving pictures more than the decoder can perform decoding processing are not combined.

That is, it is indicated that a plurality of moving pictures that each normally do not benefit from the parallel processing of plural decoder cores are combined together in a range where the decoder can perform decoding processing, thereby benefiting from the parallel processing of plural decoder cores. Furthermore, from the viewpoint of timings at which the moving pictures are displayed on the image processing device, the moving pictures to be combined together are as close as possible in the display timings.

Moving pictures to be displayed at any timings can be combined as long as the moving pictures meet the conditions in the viewpoint of the resolution described above. However, as the time point of the decoding processing and the time point of display are more distant from each other, the time of retention in an image data buffer where image data after the decoding processing is temporarily stored is adversely longer.

Therefore, sorting of moving pictures to be combined together in the viewpoint of display timings depends on the capacity of the image data buffer. In the case of a game machine as an example, it is preferable that decoding design processing is performed for moving pictures that are reproduced at the same time or in the same period in one event and that meet the conditions (1) to (3) described above as data to be combined together.

<Encoding Processing (Step S2)>

Figure 2:
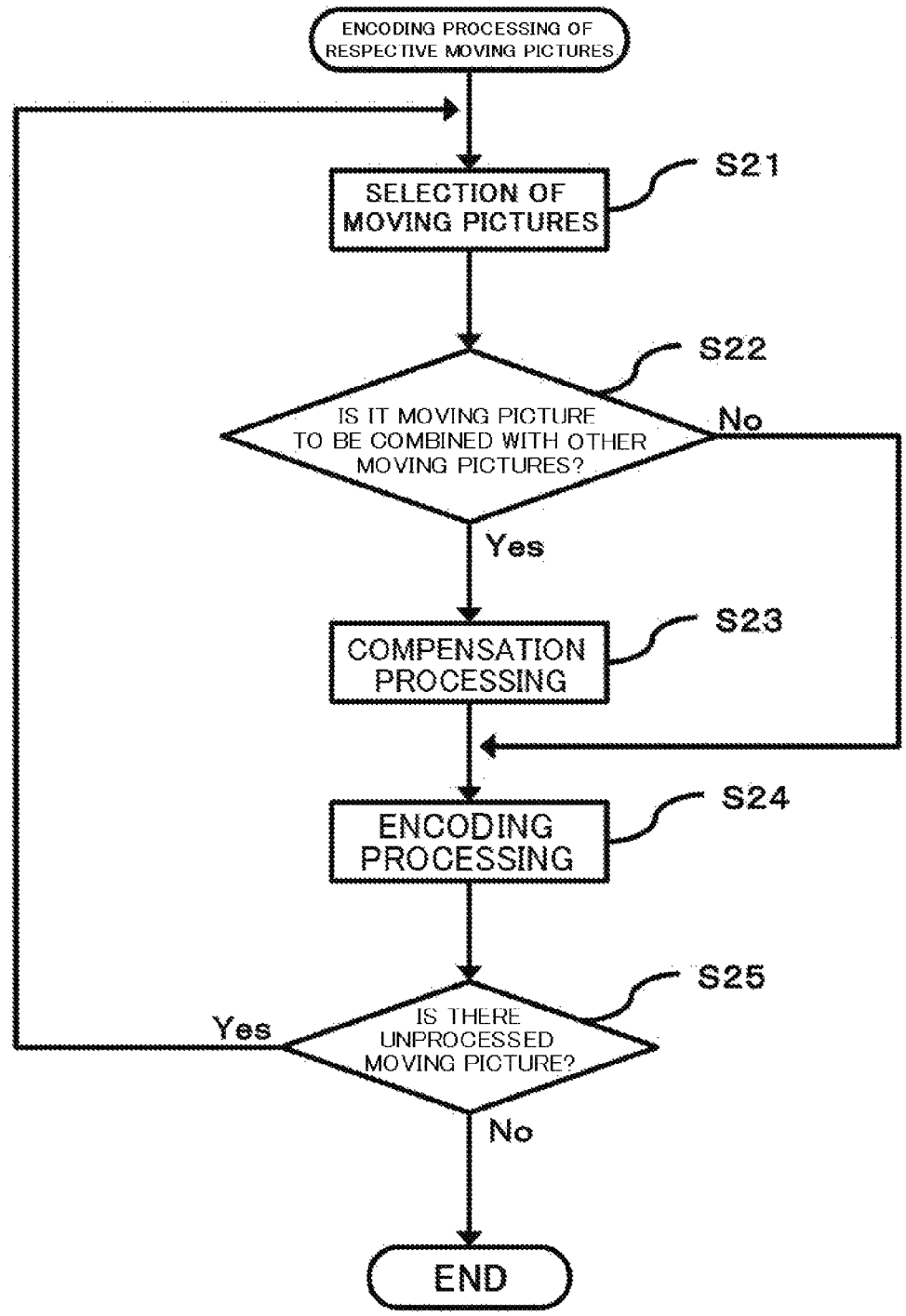
FIG. 2 is a flowchart illustrating a procedure of encoding processing of respective moving pictures.

Encoding processing for moving pictures is explained next with reference to FIG. 2. The representation designer first selects a moving picture to be encoded (step S21). Subsequently, the representation designer determines whether the selected moving picture is a moving picture to be combined with other moving pictures on the basis of the decoding design processing described above (step S22).

Figure 20A:
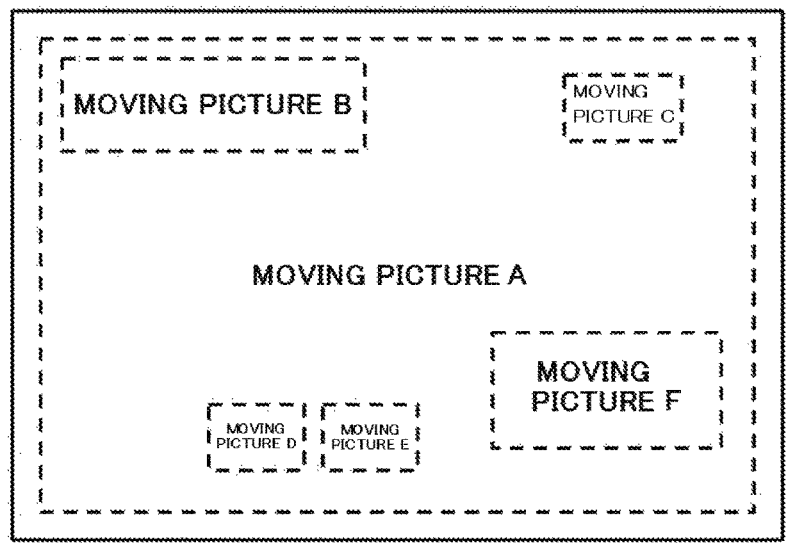
FIGS. 20(a) and 20(b) are explanatory diagrams of moving picture reproduction in a game machine such as a pachinko machine or a pachislot machine.

In the case of a moving picture A displayed on the entire display screen as illustrated in FIG. 20(a) as an example, decoding processing is performed singly and thus it is determined as NO at step S22. The representation designer then skips step S23 and the process proceeds to step S24.

On the other hand, in the case of a moving picture B to a moving picture G (having a vertical resolution equal to or lower than 128 pixels, for example) as illustrated in FIG. 20(a) as an example, the representation designer designs these moving pictures to be combined with any other moving picture and be subjected to decoding processing. Therefore, it is determined as YES at step S22 and the process proceeds to step S23.

At step S23, the representation designer performs padding processing of image data. The processes at steps S22 and S23 can be performed using software for representation creation. That is, using software with which the designer can select a moving picture necessary for representation and to which the display timing can be input, the designer can alternatively determine whether the selected moving picture is a moving picture to be combined in view of the above conditions, and output padded data as required according to the resolution of the moving picture to be combined.

Figure 3A:
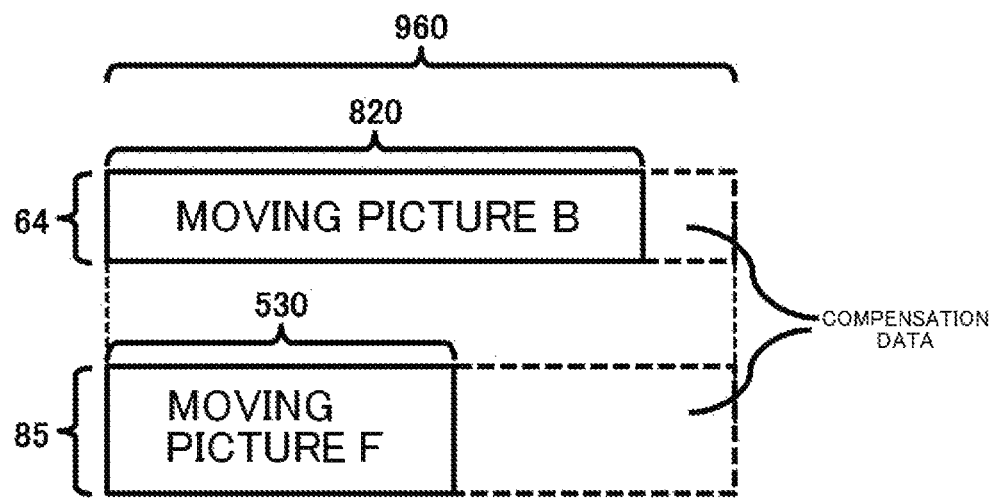
FIGS. 3(a) and 3(b) are explanatory diagrams of padding processing of image data.
Figure 3B:
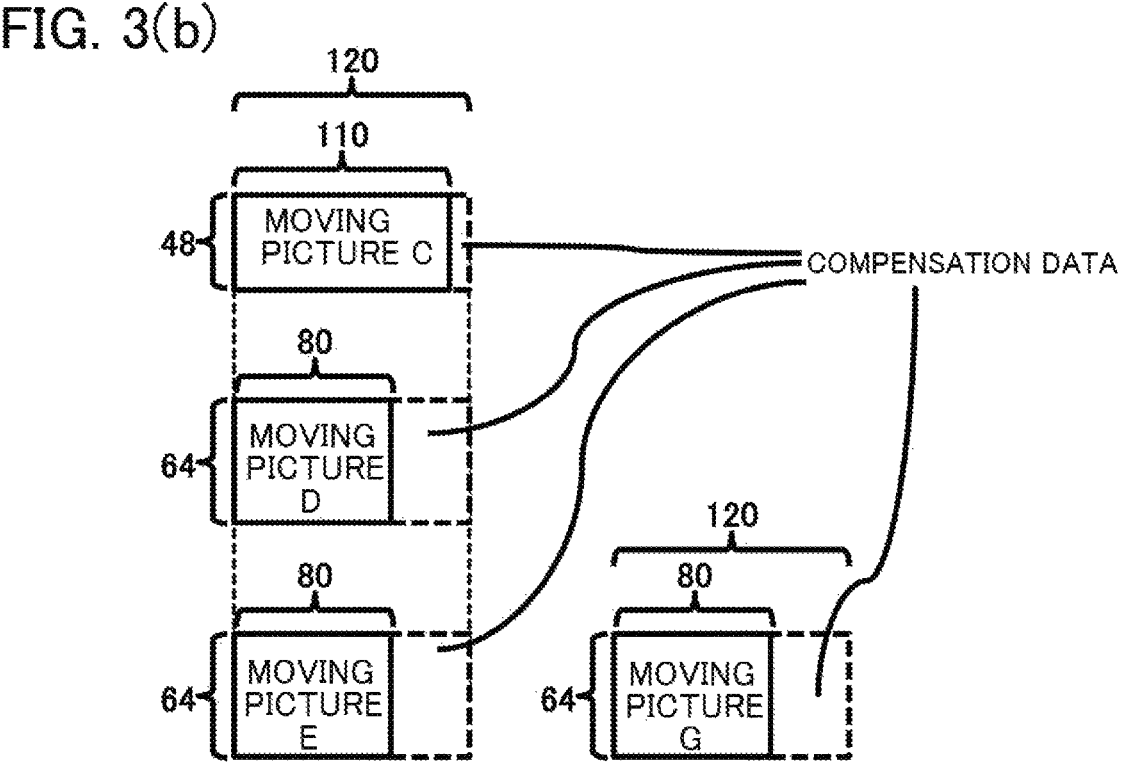

FIG. 3 are explanatory diagrams of the padding processing.

Figure 20B:
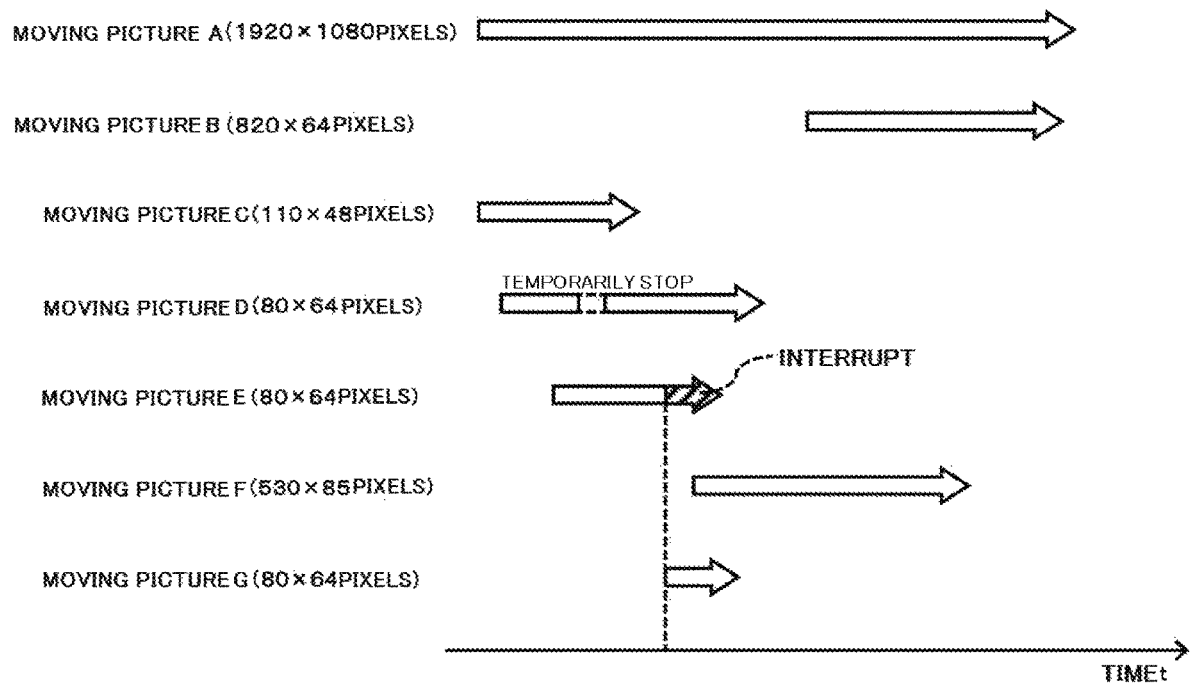
Figure 21:
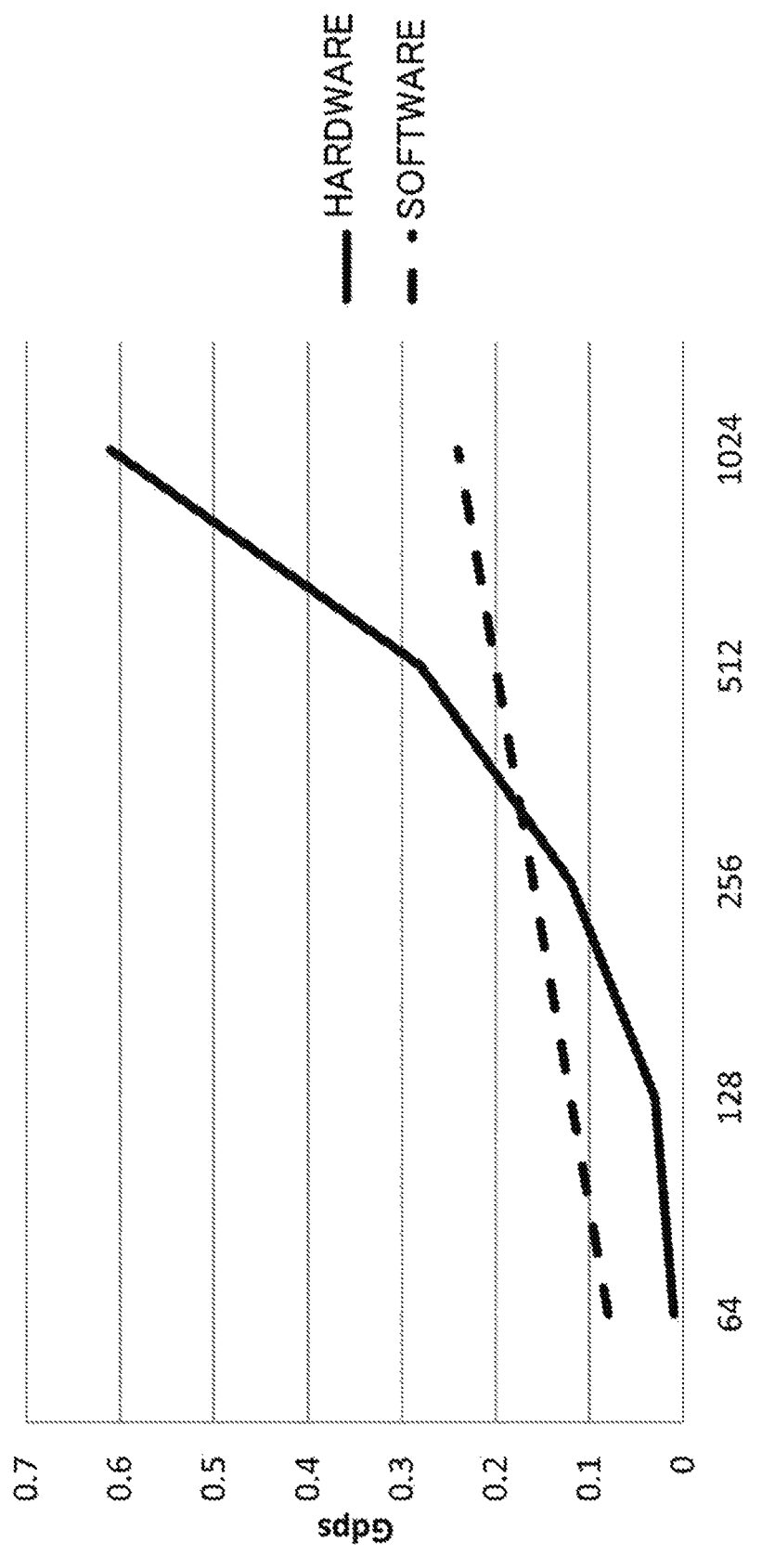
FIG. 21 is a diagram illustrating a decode performance of a general-purpose hardware decoder.
Figure 22A:
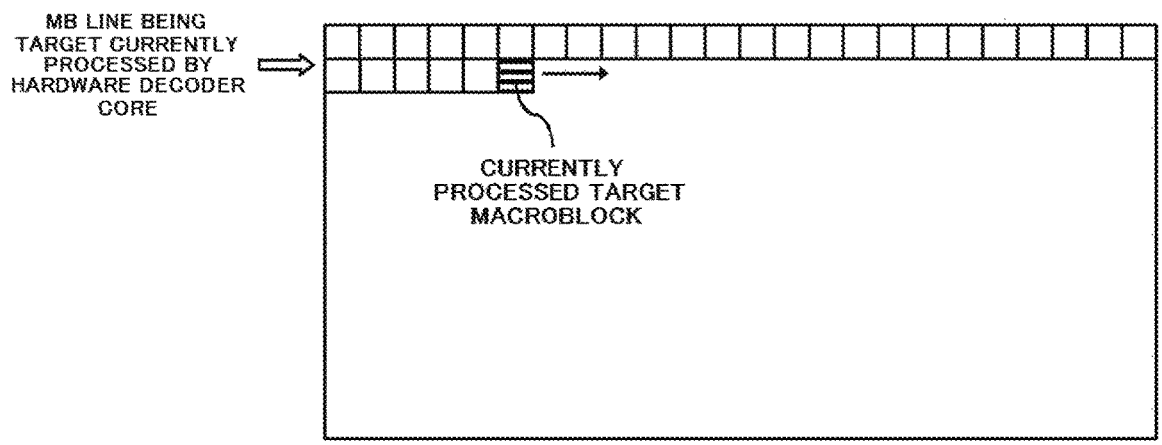
FIGS. 22 (a) and 22(b) are explanatory diagrams of parallel processing in the vertical direction in a hardware decoder.
Figure 22B:
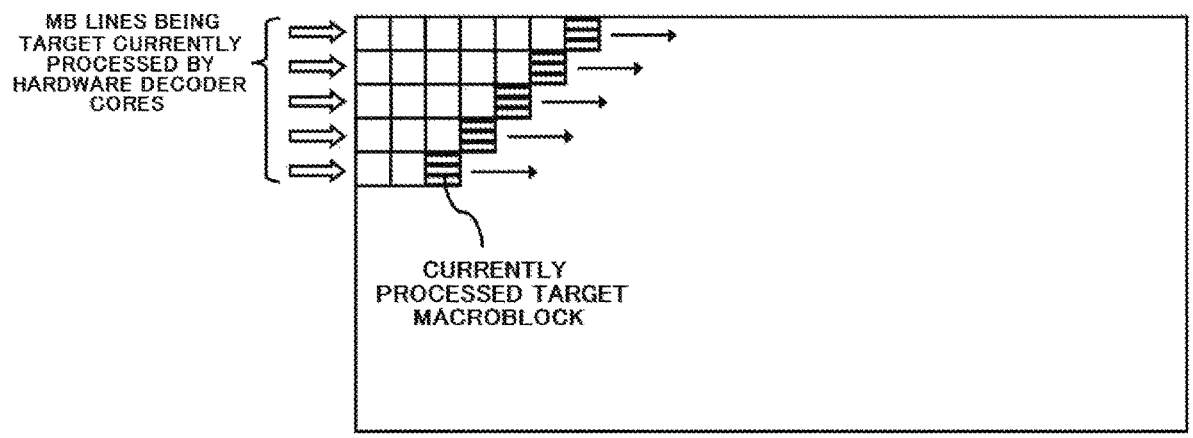

For example, a case where the moving picture B and the moving picture F can be combined as a set, and the moving picture C, the moving picture D, and the moving picture E (the moving picture G) are to be combined as a set is assumed. The moving picture G is a moving picture that is to be reproduced after interruption of the moving picture E when the moving picture E is interrupted in the middle of reproduction, as illustrated in FIG. 20(b). It is accordingly necessary that at least moving pictures in the same set have equal resolutions in the horizontal direction because of a method of decoding processing described later.

Therefore, the representation designer or the software performs padding processing of image data with respect to the horizontal direction of the moving pictures to equalize the respective resolutions in the horizontal direction. At this time, the representation designer or the software can uniformly equalize the respective resolutions in the horizontal direction of the moving pictures to the maximum processing resolution in the horizontal direction of the decoder. This enables all sets to have the same maximum processing resolution and facilitates the padding processing itself.

However, for example, if the respective resolutions in the horizontal direction of moving pictures are uniformly equalized to the maximum processing resolution in the horizontal direction of the decoder in a case where only moving pictures having low resolutions in the horizontal direction, such as the moving picture C, the moving picture D, and the moving picture E, are combined together, pad data increases and the encoding efficiency lowers.

Therefore, when moving pictures are to be combined together, it is advantageous to set some references to be matched, such as 120, 240, 480, 960, and 1920 pixels in the horizontal direction. The references to be matched are determined based on the resolution of a moving picture having a highest horizontal resolution among the moving pictures to be combined together. Therefore, setting of the number of references or the values thereof depends on variation in the respective horizontal resolutions of the moving pictures to be combined together.

In a case where some references are thus set in the horizontal resolution, the horizontal resolutions of moving pictures are also one of sorting conditions on the moving pictures to be combined, in addition to the conditions (1) to (3) described above.

At step S24, the encoder performs encoding processing of each of the moving pictures. The encoder performs encoding processing of each of the moving pictures by software processing based on the H.264 standard, for example. A condition at this time is that the encoding processing is performed in such a manner that the numbers of frames included in one GOP are equal (30, for example) and the orders of picture types of the frames of the respective moving pictures are the same at least in the moving pictures to be combined.

Figure 4:
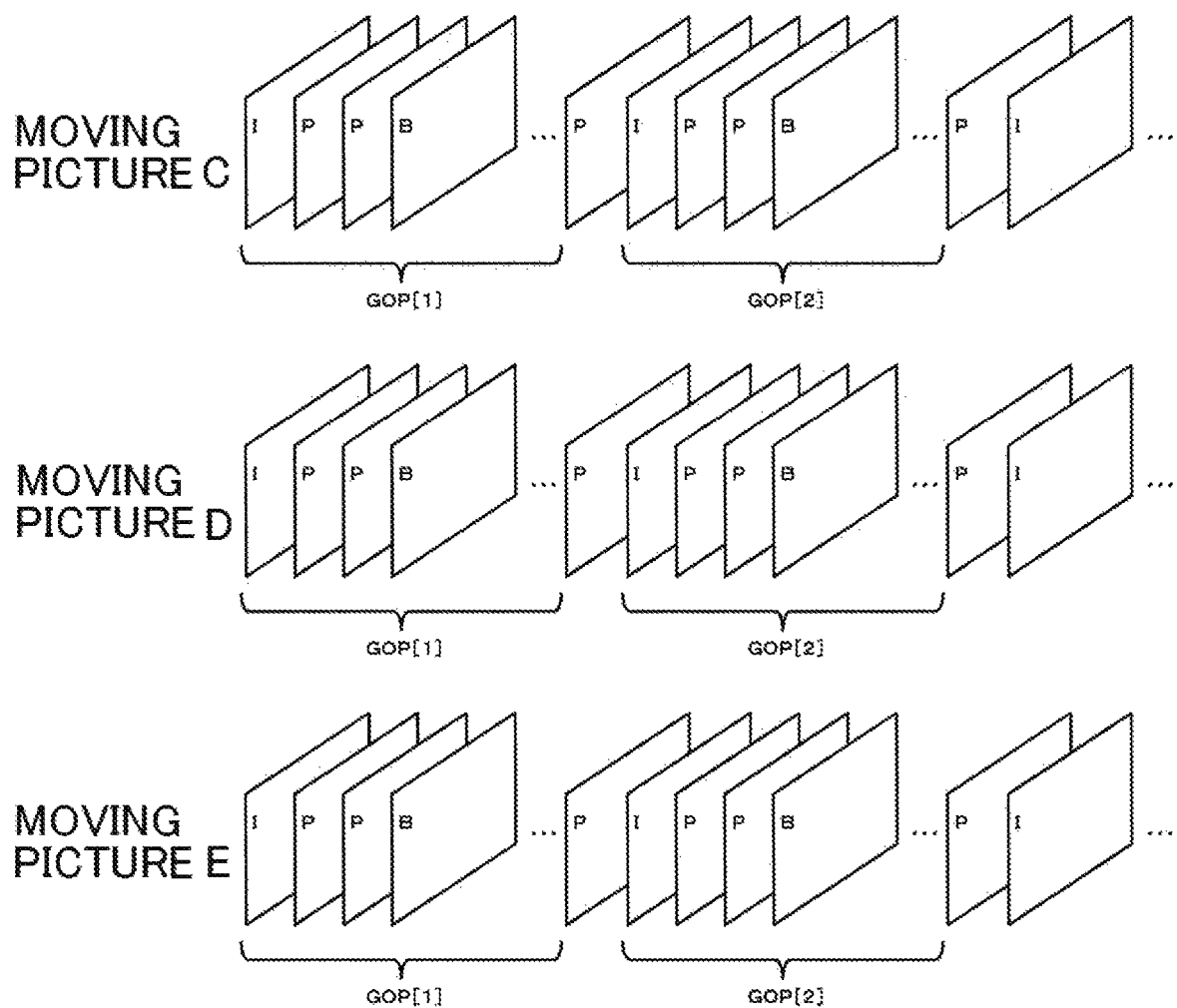
FIG. 4 is an explanatory diagram of time adjustment for matching picture types of moving pictures each other in pre-processing before decoding.

FIG. 4 is an image diagram illustrating encoding processing for the moving picture C, the moving picture D, and the moving picture E with respective picture types of the moving pictures matched each other. The padding processing described above is performed and the moving pictures are encoded in a state where at least vertical resolutions of the moving pictures are equal and the orders of picture types are matched. In the example illustrated in FIG. 4, a first frame of a GOP in each moving picture is an I picture, second and third frames are P pictures, and a fourth frame is a B picture. The numbers of frames included in respective GOP[1]s of the moving picture C, the moving picture D, and the moving picture E are the same, and the numbers of frames included in respective GOP[2]s of the moving pictures are similarly the same. However, it is unnecessary that the number of frames in the GOP[1] and the number of frames in the GOP[2] are the same.

Figure 5:
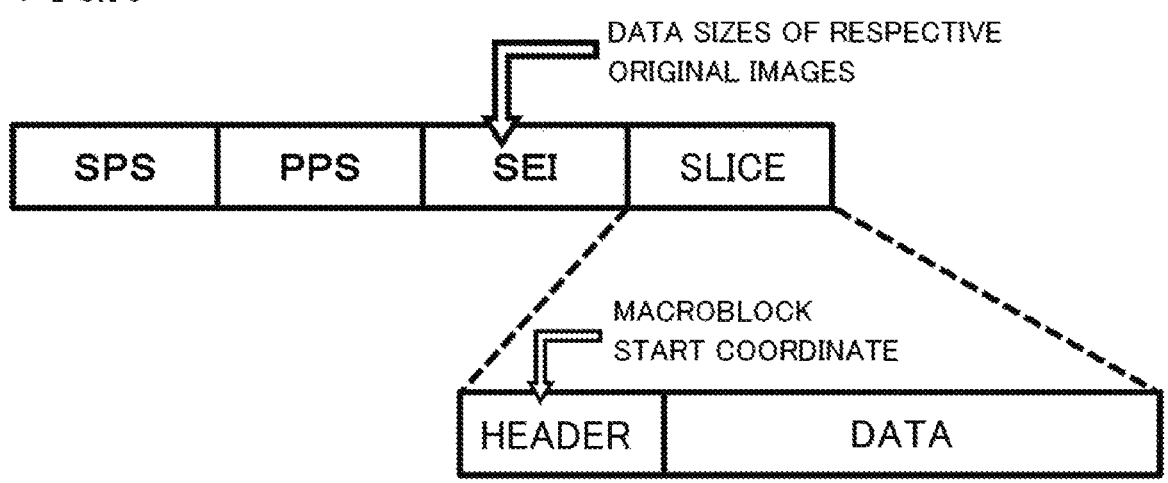
FIG. 5 is a diagram illustrating a bitstream of respective encoded moving pictures.

A bitstream of each moving picture after encoding is explained next with reference to FIG. 5. FIG. 5 is a diagram illustrating a bitstream of an encoded moving picture. As in the conventional technique, the bitstream of a moving picture includes pictures each regarded as one slice. Information of a macroblock start coordinate is stored in the header of a slice.

Another characteristic point of the present invention is performing encoding processing where "the data size of the original image" (the resolution) (110×48 in the case of the moving picture C illustrated in FIG. 3, for example) is separately input to the SEI or a container of MP4 or the like that contains a NAL. This is to enable the image processing device that performs decoding processing of each moving picture and displays the moving picture to extract the original image after the decoding processing, as will be described later.

At step S25, the representation designer or the software determines whether there remains an unprocessed moving picture. When an unprocessed moving picture remains (it is determined as YES), the process returns to step S21 to repeat the processes described above. When processing of all moving pictures is completed, the process ends. In the first embodiment described above, the resolutions in the vertical direction of the moving pictures are kept, that is, different. However, it is also possible to equalize also the respective resolutions in the vertical direction of the moving pictures to be combined and subjected to decoding processing by the padding processing.

When also the resolutions in the vertical direction are equalized, replacement of the moving pictures to be combined together in the same set and subjected to decoding processing can be easily performed and processing in the encoding design processing described above is simplified. For example, because the resolution in the vertical direction of the moving picture C is 64 pixels, the padding processing is performed to change the resolutions in the vertical direction of the moving picture D, the moving picture E, and the moving picture G being targets of combination from 48 pixels to 64 pixels. When subsequently intending to display a moving picture H (having a vertical resolution of 64 pixels regardless of whether the padding processing has been performed, not illustrated) instead of the moving picture E, the representation designer can easily replace the moving picture E with the moving picture H.

<Image Data Processing in Image Processing Device Including Decoder (Step S3)>

Figure 6:
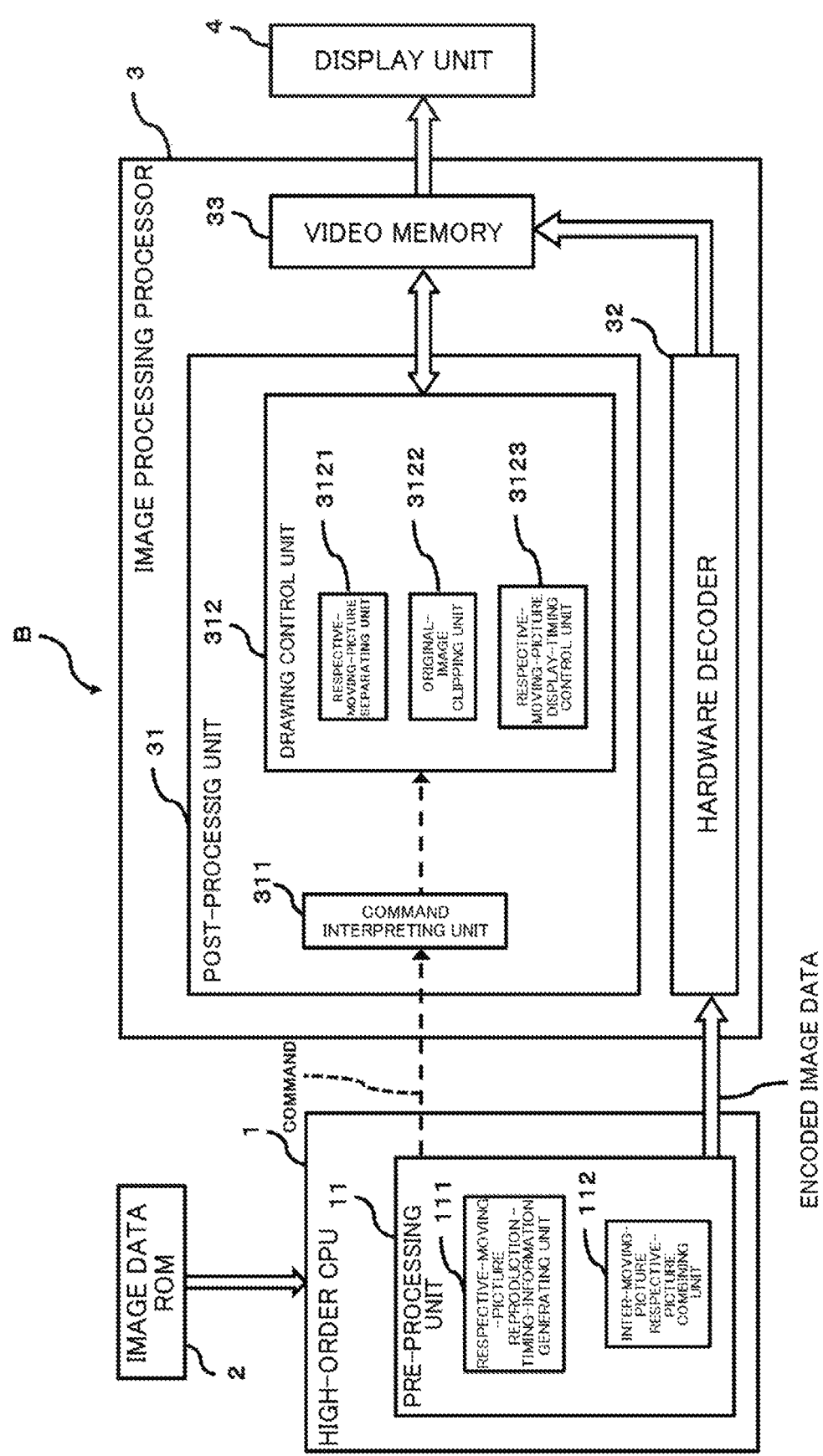
FIG. 6 is a block diagram illustrating a configuration of an image processing device used in a first embodiment of the image data processing method according to the present invention.

FIG. 6 is a block diagram illustrating a configuration of an image processing device B used in the first embodiment of the present invention.

The image processing device B illustrated in FIG. 6 includes a high-order CPU (central processing unit) 1, an image data ROM 2, an image processing processor 3, and a display unit 4.

The high-order CPU 1 includes a pre-processing unit 11 and the pre-processing unit 11 includes a respective-moving-picture reproduction-timing-information generating unit 111 and an inter-moving-picture respective-picture combining unit 112. The image processing processor 3 includes a post-processing unit 31, a hardware decoder 32, and a video memory 33, and the post-processing unit 31 has a command interpreting unit 311 and a drawing control unit 312. A respective-moving-picture separating unit 3121, an original-image clipping unit 3122, and a respective-moving-picture display-timing control unit 3123 are included in the drawing control unit 312.

Data of each moving picture encoded by the <encoding processing (step S2)> described above is stored in the image data ROM 2. That is, data information of the original image size is stored in a non-VCL NAL unit such as SEI of a stream of each of moving pictures in a state where the horizontal resolutions of the moving pictures to be combined with other moving pictures are equalized or the horizontal resolutions and the vertical resolutions thereof are both equalized according to the reproduction timings of the moving pictures.

Image data processing is performed in the image processing device illustrated in FIG. 6 in the following manner.

First, the high-order CPU 1 reads encoded image data associated with necessary moving pictures from the image data ROM 2 on the basis of representation designing in the image processing device B. The data read at this time is based on information related to each of moving pictures that can be combined together and are designed in the <decoding design processing (step S1)> described above, and the read data is combined by the inter-moving-picture respective-picture combining unit 112 of the pre-processing unit 11.

Figure 7:
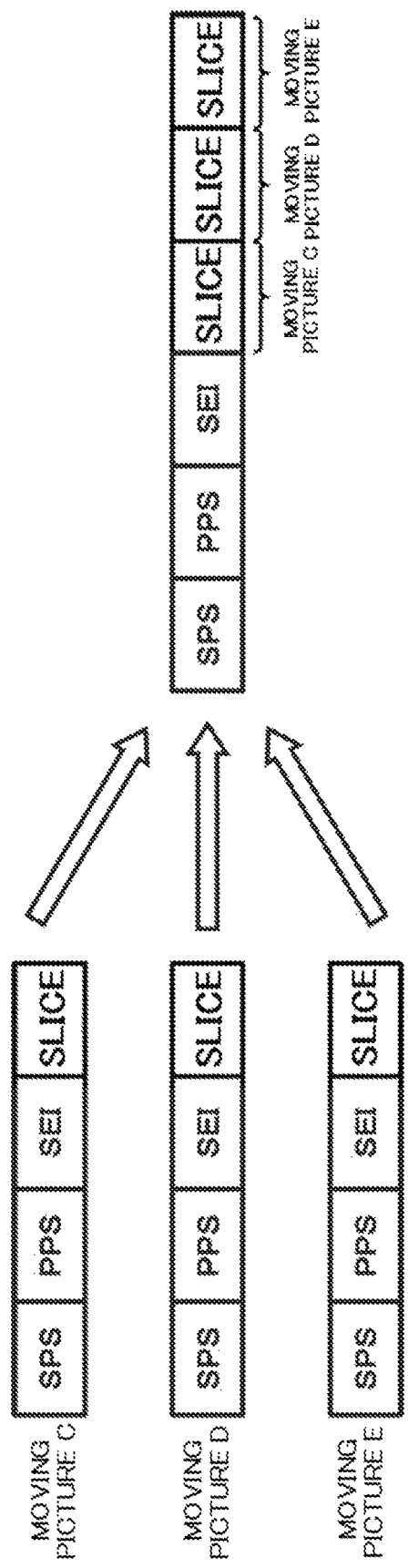
FIG. 7 is an explanatory diagram of combining respective moving pictures at a level of slices being encoded image data and integrally decoding the moving pictures while considering the moving pictures as one picture of a plurality of slices.

FIG. 7 is a diagram illustrating recomposition of a bitstream performed by the inter-moving-picture respective-picture combining unit 112 of the pre-processing unit 11. The inter-moving-picture respective-picture combining unit 112 combines data of moving pictures corresponding to one read picture at the slice level to obtain moving picture data of plural slices. As described above, in a bitstream of encoded data of each moving picture, one picture is normally configured as one slice as illustrated on the left part in FIG. 7. In contrast thereto, in the combining processing, slice portions are extracted from the bitstreams of the encoded data of respective moving pictures and are arranged in series to be combined together.

In the present embodiment, the SPS (Sequence Parameter Set), the PPS (Picture Parameter Set), and the SEI (Supplement Enhancement Information) are included as a group, and parameter sets and the like of a bitstream after combination are rewritten as necessary. For example, while the SPS includes information on the number of reference frames and the width and height of a frame, at least the height information is corrected because one picture after combination is different in the height (the vertical resolution) from the original individual pictures. The PPS includes information on the encoding method, the quantization coefficient, and the like and the information does not need to be corrected if the encoding method, the quantization coefficient, and the like are set to be common to moving pictures at the time of the encoding processing. When a moving picture to be combined has a different quantization coefficient, the quantization coefficient is corrected by rewriting Slice_QP_delta included in the header of the slice.

Information on the data size of the original image is stored in the container such as the SEI in the bitstream of each moving picture before combination. The inter-moving-picture respective-picture combining unit 112 extracts the information of the original image data from each piece of the SEI of the bitstreams of the moving pictures to be combined and supplies the extracted information to the image processing processor 3.

Information of the start macroblock coordinate is stored in the header of each of the slices to be combined together. In the example illustrated in FIG. 7, the start macroblock coordinate stored in the header of the slice of the moving picture C does not need to be rewritten. However, the start macroblock coordinates stored in the headers of the corresponding slices of the moving picture D and the moving picture E are rewritten by the inter-moving-picture respective-picture combining unit 112 according to the positions of the respective start macroblocks of the moving picture D and the moving picture E, respectively.

The respective slices of the moving pictures are extracted sequentially by the method described above and are combined to form a new bitstream, and the new bitstream is supplied to the hardware decoder 32 of the image processing processor 3. Because the numbers of frames in the GOPs and the picture types of the respective frames are matched when the moving pictures are encoded, the pictures types of the slices of the moving pictures combined together by the inter-moving-picture respective-picture combining unit 112 match each other.

Timings at which the moving pictures based on the combined encoded image data being composed of plural slices are to be displayed may be different. For example, as illustrated in FIG. 20(b), reproduction start timings of the moving picture C, the moving picture D, and the moving picture E are deviated. Therefore, the high-order CPU 1 generates reproduction timing information of each moving picture on the basis of the designed representation information using the respective-moving-picture reproduction-timing-information generating unit 111 and supplies the generated information to the image processing processor 3.

The hardware decoder 32 performs decoding processing of the combined encoded image data supplied from the high-order CPU 1 and supplies the result of the decoding to the video memory 33 as well as outputting a decoding completion notification (not illustrated) to the high-order CPU 1.

The high-order CPU 1 having received the decoding completion notification from the hardware decoder 32 issues an instruction on post-processing to the post-processing unit 31 of the image processing processor 3. The command interpreting unit 311 of the post-processing unit 31 supplies at least original image data information of each of the moving pictures associated with combination and information associated with respective reproduction timings of the moving pictures, which are included in the instruction, to the drawing control unit 312.

The respective-moving-picture separating unit 3121, the original-image clipping unit 3122, and the respective-moving-picture display-timing control unit 3123 included in the drawing control unit 312 perform predetermined post-processing for the decoded image data stored in the video memory 33 on the basis of the original image data information of each of the moving pictures and the information associated with the reproduction timing of each of the moving pictures, and the start macroblock coordinate data stored in the header of each slice, and then supplies an obtained result to the display unit 4 to be displayed as each of the moving pictures.

Contents of the processing performed by the pre-processing unit 11 and the post-processing unit 31 are further explained with reference to FIGS. 8 to 10. A display instruction for moving pictures is issued in the high-order CPU 1 on the basis of operation processing designed for the image processing device (in the case of a game machine, an operation to design progress of a game in a game machine in which the image processing device is incorporated). For example, in the example illustrated in FIGS. 20(a) and 20(b), an instruction such as "reproduce the moving picture A from a predetermined timing", or "interrupt reproduction of the moving picture E and start reproduction of the moving picture G instead" in the middle of reproduction of the moving picture E is issued in the high-order CPU 1.

The high-order CPU 1 acquires encoded image data from the image data ROM 2 on the basis of the issued instruction.

For example, in the case of an instruction to "reproduce the moving picture A from a predetermined timing", the high-order CPU 1 acquires encoded image data related to the moving picture A from the image data ROM 2. The high-order CPU 1 supplies the encoded image data related to the moving picture A to the hardware decoder 32 of the image processing processor 3. After the hardware decoder 32 stores decoded image data in the video memory 33, the high-order CPU 1 creates an image using the drawing control unit 312 and supplies the created image to the display unit 4 at a predetermined timing to enable reproduction of the moving picture A on the display unit 4.

When an instruction to reproduce a plurality of moving pictures, for example, the moving pictures C, D, E, and G is issued in the high-order CPU 1, the high-order CPU 1 reads necessary encoded image data from the image data ROM 2. The inter-moving-picture respective-picture combining unit 112 rewrites information of the first macroblock coordinate included in the header area of the slice included in the bitstream of each of the read moving pictures according to the combination situation of the moving pictures and combines the plural slices to supply the combined slices to the hardware decoder 32 of the image processing processor 3. At the time of reading the necessary encoded image data from the image data ROM 2, the high-order CPU 1 extracts the information related to the data size of the original image, which is stored in the SEI of the bitstream of each of the read moving pictures.

Rewriting of the coordinate information of the first macroblock included in the header area of the slice is performed as follows. Information related to the number of the first macroblock of the relevant slice is stored in the header area and information of "0" is initially stored because the first macroblock normally starts from the upper left part of the screen. However, in moving picture data to be combined, the coordinate of the first macroblock changes according to arrangement of the slices at the time of combination and thus the coordinate is changed to a desired value by the rewriting.

Figure 8A:
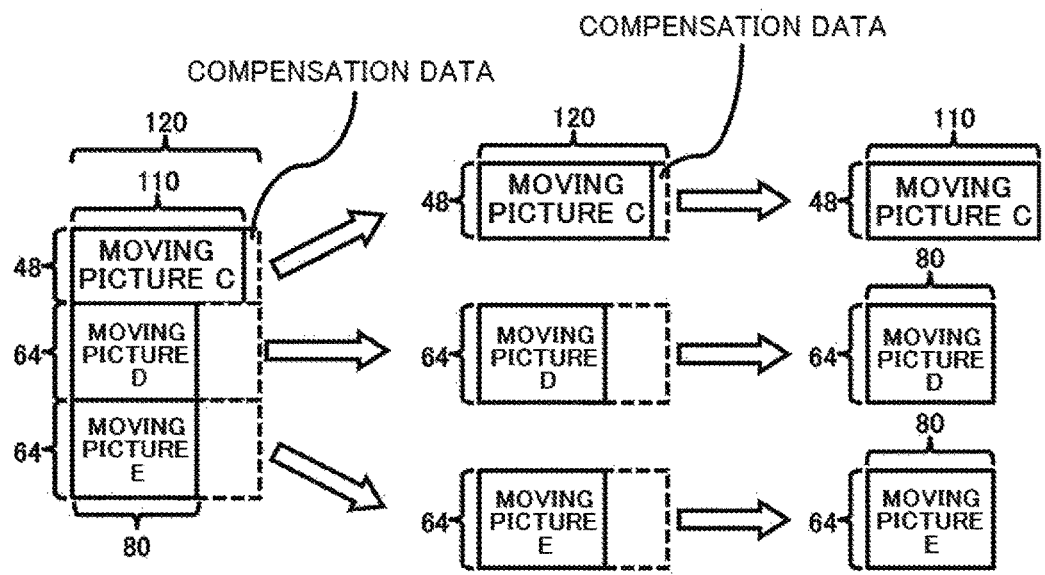
FIGS. 8(a) and 8(b) are explanatory diagrams of processing of a post-processing unit.

When the moving picture C, the moving picture D, and the moving picture E are to be combined collectively as one large image as illustrated in FIG. 8(a), the coordinates of the first macroblocks of the moving picture D and the moving picture E change and thus the coordinate information needs to be rewritten according to the status of combination while the coordinate information of the first macroblock included in the header area of the slice of the moving picture C does not need to be rewritten. For example, when a macroblock is composed of 16×16 pixels and the resolution in the horizontal direction of the moving picture C (the number of pixels in the vertical direction is 48) including pad data is 120, the first macroblock coordinate of the moving picture D is 24 and thus the information initially having a value of "0" is changed to "24". Similarly, the first macroblock coordinate of the moving picture E is changed to "56". In this way, the high-order CPU 1 generates an H.264 stream including plural slices that can be normally decoded by the hardware decoder 32.

When receiving the encoded image data, the hardware decoder 32 recognizes that one picture is composed of plural slices (three slices in this example). Because composing one picture of plural slices is approved by the standard (H.264), the hardware decoder 32 can perform the decoding processing of the input encoded image data as it is.

However, the hardware decoder 32 does not recognize that the encoded image data is a combination of a plurality of moving pictures. In other words, it is unnecessary to add any alteration to the hardware decoder 32.

After the encoded image data is decoded by the hardware decoder 32 and is stored in the video memory 33, the high-order CPU 1 generates information for clipping individual images from the combined decoded image data, that is, information such as the data sizes of the respective original images of the moving pictures and the moving-picture display timings as instruction information, and outputs the generated instruction information to the image processing processor 3. This instruction information is interpreted by the command interpreting unit 311 of the image processing processor 3.

For example, when the interpreted instruction is for instructing to "reproduce the moving picture C from a predetermined timing", "reproduce the moving picture D from a predetermined timing", and "reproduce the moving picture E from a predetermined timing", the command interpreting unit 331 outputs an instruction to the drawing control unit 312 to clip an image associated with the moving picture C, an image associated with the moving picture D, and an image associated with the moving picture E from the decoded image data stored in the video memory 33. That is, because the information for clipping individual images from the combined decoded image data, the information of the data sizes of the respective original images of the moving pictures, and the information such as the moving-picture display timings are received from the pre-processing unit 11 of the high-order CPU 1, the command interpreting unit 311 outputs the received information to the drawing control unit 312. The drawing control unit 312 controls the respective-moving-picture separating unit 3121, the original-image clipping unit 3122, and the respective-moving-picture display-timing control unit 3123 to display the moving pictures corresponding to the instruction from the high-order CPU 1 on the display unit 4.

Figure 8B:
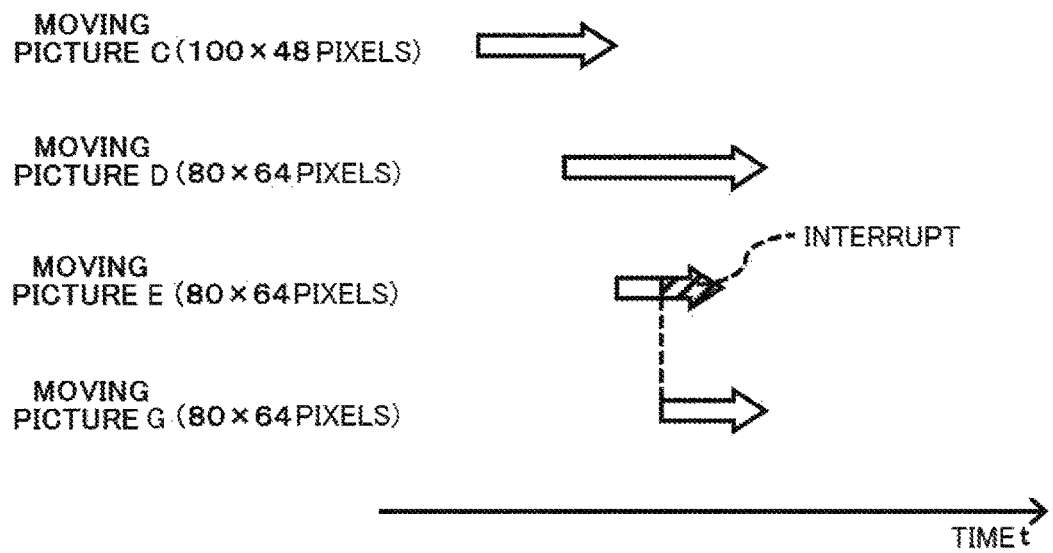

FIG. 8(a) illustrates a part of the image processing in the image processing processor 3 and FIG. 8(b) illustrates respective reproduction timings of moving pictures. Decoded data as illustrated on the left part in FIG. 8(a) is stored in the video memory 33 and the moving picture C, the moving picture D, and the moving picture E being moving pictures in desired regions, from which padding data is deleted, as illustrated on the right part in FIG. 8(a) are acquired using the information for clipping out the moving pictures and the information of the original image data sizes. Further, the moving pictures are displayed on the display unit 4 at timings as illustrated in FIG. 8(b) on the basis of the moving-picture display timing information. Therefore, the video memory 33 requires also a function to store therein decoded image data until desired timings, a function of so-called "buffer".

Because the moving pictures are different in the reproduction periods, the decoding processing of a moving picture having a shorter reproduction period ends earlier as illustrated in FIG. 8(b). That is, when the moving pictures C, D, and E are combined and encoded image data is supplied to the hardware decoder 32, the decoding processing of the moving pictures C and E ends during decoding of the moving picture D because the respective reproduction periods of the moving pictures have a relation that the moving picture D>the moving picture C>the moving picture E. At this time, decoding of another moving picture can be put in the region for the moving picture E or the moving picture C whose decoding has ended, if conditions are met from the viewpoint of the vertical resolution of the moving picture, the display timing, and the capacity of the data buffer in the video memory. Also in this case, matching in units of the GOP with another moving picture is performed.

States of GOPs and respective slices in a case where the moving picture E is switched in the middle to the moving picture G as illustrated in FIG. 8(b) are explained next with reference to FIGS. 9 and 10. FIG. 9(a) is a diagram illustrating GOPs of respective moving pictures in a case where the moving picture E is not interrupted, and illustrates that the GOP[1] to a GOP[3] of each of the moving pictures are read from the image data ROM 2. On the other hand, FIG. 9(b) illustrates GOPs read from the image data ROM 2 in a case where the moving picture E is interrupted and the moving picture G is reproduced instead. In the example illustrated in FIG. 9(b), the GOP[1] of the moving picture G is inserted instead of the GOP[3] of the moving picture E after the GOP[2] of the moving picture E.

Figure 10:
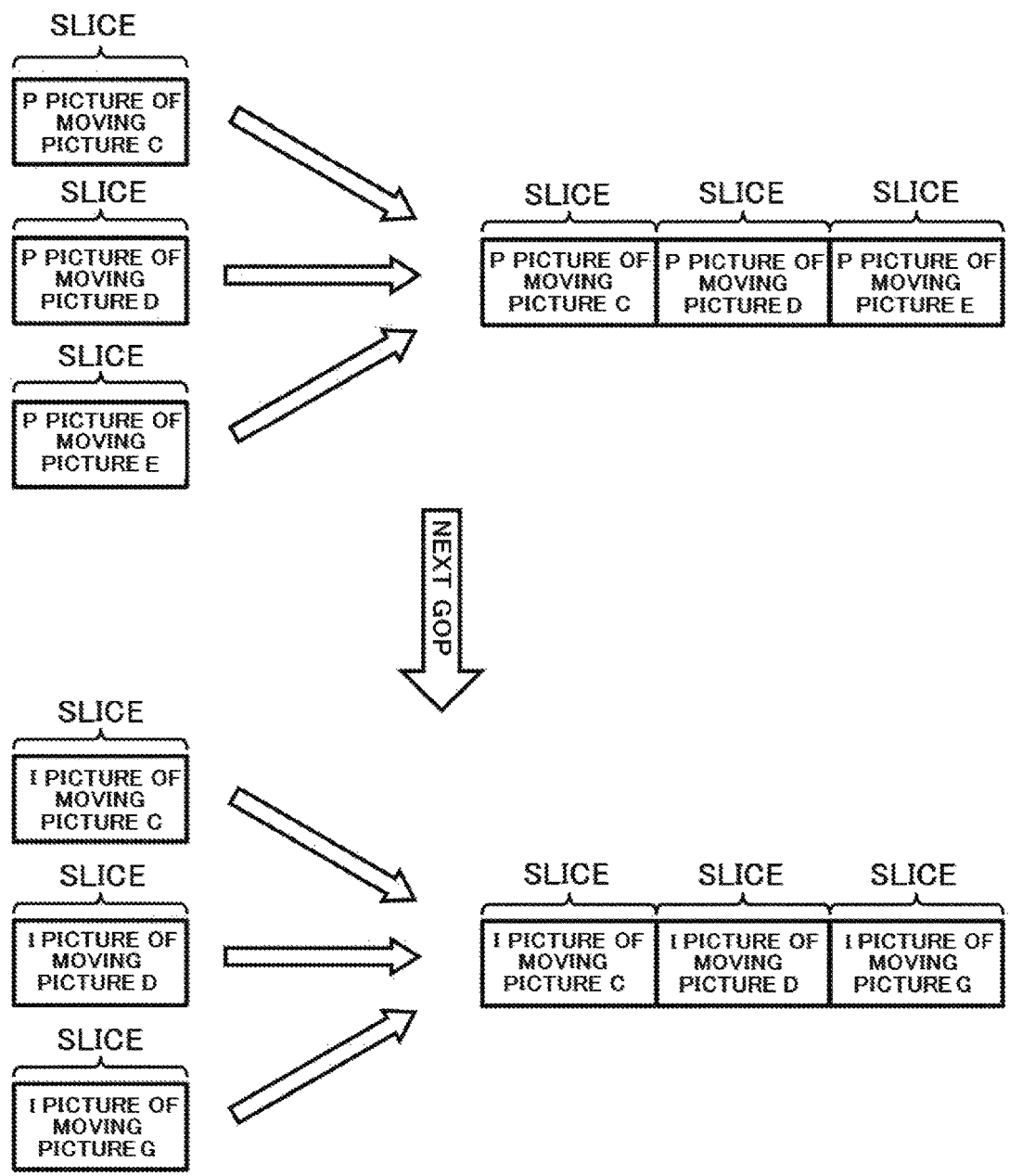
FIG. 10 is an explanatory diagram of a case in which a moving picture is interrupted to be switched to another moving picture.

FIG. 10 illustrates the boundary between the GOP[2] of the moving picture E and the GOP[1] of the moving picture G seen from the viewpoint of combination of pictures of the moving pictures. Illustrations of NAL units of the SPS, the PPS, and the SEI are omitted. As illustrated in FIG. 10, respective P pictures of the moving picture C, the moving picture D, and the moving picture E are combined in the last frame before switching, while respective I pictures of the moving picture C, the moving picture D, and the moving picture G are combined in the first frame after the switching. That is, because the I picture of the moving picture G is always required to start reproduction of the moving picture G, the switching from the moving picture E to the moving picture G needs to be performed at a timing when the picture types of the moving picture C and the moving picture D are the I picture.

As described above, according to the first embodiment of the image data processing method of the present invention, moving pictures having low resolutions in the vertical direction are combined together and are subjected to decoding processing at the same time. Accordingly, even when parallel processing is performed with a plurality of decoder cores in the vertical direction, the function can be utilized.

Furthermore, the associated processing such as initialization of the decoder is decreased by reduction in the number of times of decoding processing due to combination of a plurality of moving pictures and thus the processing time is considerably shortened.

The moving pictures are combined in such a manner that plural slices of the moving pictures are brought together in units of pictures. Therefore, there is no need to alter the configuration or function of the hardware decoder 32.

A second embodiment of the present invention is explained next. In the first embodiment described above, to combine moving pictures, the orders of picture types of respective GOPs of the moving pictures are set in order and the numbers of frames therein are matched at the time of encoding. Therefore, switching of moving pictures needs to be performed at a timing when the picture types are all I pictures and there is a little restriction on the switching timing of moving pictures. Furthermore, while moving pictures having reproduction timings that are close to each other are combined, the information for controlling the moving-picture display timing is supplied from the pre-processing unit 11 of the high-order CPU 1 to the post-processing unit 31 of the image processing processor 3 and a data buffer for storing image data therein is required.

In the second embodiment, the method of the first embodiment is further improved and a method in which information for matching the orders of picture types of GOPs or for controlling the display timings is not supplied to the image processing processor is disclosed.

The general flow of the image data processing method is explained first. As illustrated in FIG. 1, a designer of representation images performs representation designing on which moving pictures are to be displayed at which timings on an image processing device (which is incorporated in a pachinko machine, for example) that performs display processing for predetermined moving pictures. At this time, designing of decoding processing including sorting of moving pictures, on how a plurality of moving pictures among moving picture displayed on the image processing device are to be combined together and be subjected to decoding processing is performed (step S1). In this case, the representation designer is a person that determines moving pictures to be reproduced at the same time in certain representation on a game machine such as a pachinko machine. For example, as illustrated in FIG. 1(b), the representation designer performs designing in such a manner that the moving picture X is processed singly and the moving picture Y and the moving picture Z having lower vertical resolutions can be combined together and be subjected to decoding processing.

The encoder encodes the moving picture X, the moving picture Y, and the moving picture Z (step S2). Next, the decoder decodes encoded data of the moving picture X singly, restores the moving picture X, and displays the moving picture X on the display unit of the image processing device at a predetermined timing. Meanwhile, depending on display timings, the decoder combines the encoded data of the moving picture Y and the moving picture Z together according to the respective display timings to decode the combined data, restores the moving picture Y and the moving picture Z, and further separates the moving pictures Y and Z from each other to display the moving pictures Y and Z on the display unit (step S3).

The second embodiment is different from the first embodiment in that the orders of picture types of respective GOPs of the moving pictures to be combined together do not need to be matched and the numbers of frames do not need to be equalized in the encoding at step S2. Therefore, moving pictures to be combined can be prepared with no regard for the picture types or the number of frames of other moving pictures to be combined therewith. The second embodiment is different from the first embodiment also in that encoded data of moving pictures are combined and decoded according to the respective display timings.

<Decoding design processing (step S1)>

Conditions for sorting out moving pictures to be combined together at the time of decoding are as follows from the viewpoint of the resolution.

(1) The resolutions in the vertical direction of moving pictures to be combined together are equal to or lower than "the number of pixels" of parallel processing performed by a plurality of decoder cores.

(2)' The total value of the resolutions in the vertical direction of the moving pictures to be combined together according to the display timings is higher than "the number of pixels" of the parallel processing performed by the decoder cores for the corresponding time.

(3)' However, the total value of the resolutions in the vertical direction of the moving pictures to be combined together according to the display timings does not exceed "the maximum resolution" in the vertical direction of the decoder at any time.

The condition (1) indicates that an individual moving picture does not benefit from the parallel processing of plural decoder cores as explained in association with the conventional technique. The condition (2)' indicates that, as a result of combination of plural moving pictures according to the display timings, the sum of the resolutions in the vertical direction exceeds the number of pixels of the parallel processing of plural decoder cores, so that the moving pictures benefit from the parallel processing. Further, the condition (3)' indicates that a plurality of moving pictures more than the decoder can perform decoding processing are not combined at any time.

That is, it is indicated that a plurality of moving pictures that each normally do not benefit from the parallel processing of plural decoder cores are combined together in a range where the decoder can perform decoding processing, thereby benefiting from the parallel processing of plural decoder cores.

In the first embodiment, moving pictures having close reproduction timings are supplied to the decoder at the same time and therefore the display timings are not considered in the conditions (2) and (3). However, because moving pictures are combined according to the display timings in the second embodiment, the conditions (2)' and (3)' include a condition related to the display timings.

In the present embodiment, a concept that a predetermined vertical resolution not exceeding "the maximum resolution" in the vertical direction of the decoder is defined and moving pictures that meet the conditions (1) and (2)' described above are appropriately combined together within the defined resolution range is introduced. That is, as in general memory management, addition or deletion of moving pictures according to the display timings is performed by management of an available region associated with the vertical resolution.

From the viewpoint of timings when moving pictures are displayed on the image processing device, the moving pictures to be combined together have display timings that are close to each other.

In regard to this point, in the first embodiment, decoding processing is performed while temporal heads of respective pieces of encoded image data are aligned and the GOPs are also matched regardless of the display timings of moving pictures to be combined together. Therefore, a data buffer that temporarily stores therein image data after the decoding processing is required in the light of the display timings of the respective moving pictures. Accordingly, in the light of the limited capacity of the data buffer, moving pictures to be combined together are moving pictures having display timings as close as possible.

In contrast thereto, in the present embodiment, encoded image data of moving pictures are combined according to the respective display timings of the moving pictures as will be described later and thus a data buffer that stores therein image data after decoding processing as in the first embodiment is not required. However, to effectively use the video memory, it is preferable that combination is performed for "moving pictures that are reproduced at the same time or in the same period in one event" as targets as explained in the first embodiment.

This decoding design processing can be performed by the representation designer or can be performed using software that enables the designer to select moving pictures necessary for representation and input the respective display timings, thereby sorting out moving pictures to be combined together. Control can be enabled by inputting a simultaneous reproduction processing capability of the image processing device to software to sort out moving pictures to be combined together based on the simultaneous reproduction processing capacity. It is alternatively possible to set a combination image frame described later and to control sorting of moving pictures using the frame.

<Encoding processing (step S2)>

The encoding processing for moving pictures is explained next. A procedure of the encoding processing is performed as illustrated in FIG. 2 in an identical manner to the first embodiment described above. Padding processing for equalizing the respective horizontal resolutions of the moving pictures (FIG. 3) and bitstreams of the encoded moving pictures (FIG. 5) are the same as those in the first embodiment.

The representation designer selects a moving picture to be encoded (step S21).

The representation designer or the software determines whether the selected moving picture is a moving picture to be combined with other moving pictures on the basis of the decoding design processing described above (step S22).

When the moving picture is a moving picture that is subjected to decoding processing singly, it is determined as NO at step S22. The representation designer or the software skips step S23 and the process proceeds to step S24.

On the other hand, when the moving picture is to be combined with any other moving picture and subjected to decoding processing, it is determined as YES at step S22 and the process proceeds to step S23.

Padding processing at step S23 is identical to that in the first embodiment and therefore explanations thereof are omitted. In the second embodiment, the image size defined by "the maximum resolution" in the vertical direction of the decoder and the horizontal resolution supposing the padding processing is referred to as "combination image frame" for sake of convenience.

Next, the encoder performs encoding processing of the respective moving pictures at step S24. The encoder performs the encoding processing by software processing based on the H.264 standard, for example. In the first embodiment, the conditions at this time are defined to perform the encoding processing where the numbers of frames included in one GOP are equal (30, for example) and the orders of picture types are the same at least in moving pictures in the same set.

In contrast thereto, in the second embodiment, encoding processing preventing the respective decoding timings and the respective decoding output timings from differing at least among moving pictures that are determined to belong to the same set at step S22 is performed. In order to prevent the decoding timings and the decoding output timings from differing, it suffices to identically manage reference buffers in the respective moving pictures. For example, in the H.264 standard, encoding not using an image whose POC Type is 2 and that corresponds to an image in a chronological future as a reference image and being common in items other than those related to the resolutions of the SPS (Sequence parameter Set) and the PPS (Picture Parameter Set) is performed. Other specific examples of identical management on the reference buffers among moving pictures to be combined together are as follows.

(a) One reference buffer is set without using B pictures.

(b) While B pictures are adopted and two reference buffers (a buffer "0" and a buffer "1", for example) are used, images in the future direction are not referred to and an older image in time is always input to the buffer "0".

With encoding of moving pictures where these conditions related to management on the reference buffers are conformed, and introduction of a concept of a padding slice as will be explained later, the moving pictures can be combined and subjected to decoding processing without equalizing the GOP configurations to match the picture types as explained with reference to FIG. 4 in the first embodiment.

A bitstream of each of the encoded moving pictures (see FIG. 5) includes pictures each regarded as one slice and information of the macroblock start coordinate is stored in the header of a slice. Furthermore, in the present embodiment, processing of separately inputting "the data size of the original image" (110×48: the resolution in the case of the moving picture C illustrated in FIG. 3, for example) to the SEI or a container of MP4 or the like that contains a NAL is performed both in the first embodiment and the second embodiment.

At step S25, the representation designer or the software determines whether there remains an unprocessed moving picture. The process returns to step S21 to repeat the above processes when an unprocessed moving picture remains (it is determined as YES), and the process ends when processing of all moving pictures is completed.

In the padding processing for equalizing the horizontal resolutions of moving pictures illustrated in FIG. 3, the resolutions in the vertical direction of moving pictures to be combined together are not equal. However, as explained in the first embodiment, also the resolutions in the vertical direction of the moving pictures can be matched to some types and constitute the combination image frame. In this case, there is an advantage that replacement of moving pictures to be combined and subjected to decoding processing as the same set can be easily performed.

<Image Data Processing by Actual Working of Image Processing Device Including Decoder (Step S3)>

Figure 11:
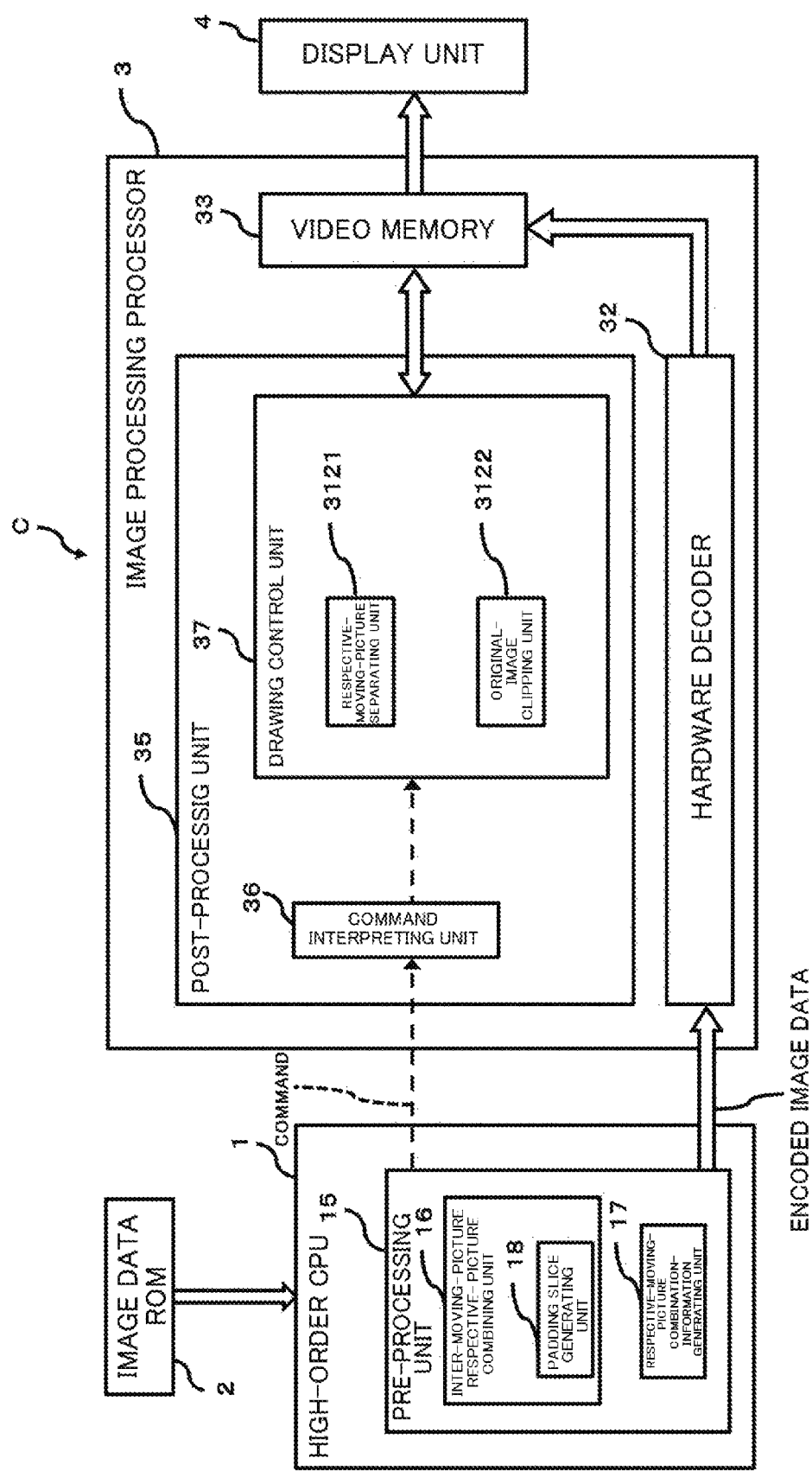
FIG. 11 is a block diagram illustrating a configuration of an image processing device used in a second embodiment of the image data processing method according to the present invention.

FIG. 11 is a block diagram illustrating a configuration of an image processing device C used in the second embodiment of the image data processing method of the present invention. The image processing device C illustrated in FIG. 11 includes the high-order CPU 1, the image data ROM 2, the image processing processor 3, and the display unit 4.

The high-order CPU 1 includes a pre-processing unit 15 and the pre-processing unit 15 includes an inter-moving-picture respective-picture combining unit 16 and a respective-moving-picture combination-information generating unit 17. The inter-moving-picture respective-picture combining unit 16 has a padding-slice generating unit 18.

The image processing processor 3 includes the hardware decoder 32, the video memory 33, and a post-processing unit 35. The post-processing unit 35 includes a command interpreting unit 36 and a drawing control unit 37. The respective-moving-picture separating unit 3121 and the original-image clipping unit 3122 are included in the drawing control unit 37.

The image data ROM 2 has respective data of moving pictures encoded by the processing described above stored therein. That is, moving picture data to which the identical management on reference buffers is applied are stored in the image data ROM 2 to prevent the respective decoding timings and the respective decoding output timings from differing among the moving pictures.

The outline of the image data processing in the image processing device C illustrated in FIG. 11 is as follows. Detailed explanations of the pre-processing unit 15 and the post-processing unit 35 will be provided later.

The high-order CPU 1 reads encoded image data associated with necessary moving pictures from the image data ROM 2 on the basis of a design operation in the image processing device C. The high-order CPU 1 reads encoded image data related to a plurality of moving pictures that can be combined together from the image data ROM 2 on the basis of information associated with moving pictures that are designed in the <decoding design processing (step S1)> and can be combined together. The inter-moving-picture respective-picture combining unit 16 subsequently combines respective pictures of the moving pictures as slices according to timings when the moving pictures are to be displayed, and rewrites information of first macroblock coordinates included in the header areas of the slices to be combined. As for a time period in which each of the combined moving pictures is not displayed or a time period in which each of the moving pictures is temporarily stopped, the padding-slice generating unit 18 generates a padding slice and applies the generated padding slice to the time periods. The inter-moving-picture respective-picture combining unit 16 supplies the combined encoded image data composed of plural slices to the hardware decoder 32 of the image processing processor 3.

The hardware decoder 32 decodes the supplied encoded image data. When the supplied encoded image data includes a plurality of moving pictures combined by the pre-processing unit 15, information of the rewritten first macroblock coordinate after combination is contained in the header of each slice in the supplied bitstreams of the moving pictures. Therefore, the hardware decoder 32 processes the encoded image data as an image of plural slices.

In the second embodiment, the inter-moving-picture respective-picture combining unit 16 combines moving pictures to be combined together at timings when the moving pictures are to be displayed. Therefore, there is no need to generate reproduction timing information associated with each of the moving pictures and notify the image processing processor 3 of the information as in the first embodiment.

However, the image processing processor 3 needs to be successively notified of information about which region is occupied by an image to be displayed or which region is available in the vertical direction of the combination image frame, and the data size of the original image. The high-order CPU 1 extracts the information related to the data size of the original image from the NAL such as the SEI of each of streams when the bitstreams of the respective moving pictures are read from the image data ROM 2, cause the respective-moving-picture combination-information generating unit 17 to generate information related to a used region in the combination image frame at the time when the moving pictures are combined together (hereinafter, "original image and combined image information"), and supplies the generated information as an instruction along with the original-image data-size information to the image processing processor 3.

That is, the high-order CPU 1 supplies encoded image data to the hardware decoder 32 of the image processing processor 3 and simultaneously issues an instruction on decoding, including the original image and combined image information generated by the respective-moving-picture combination-information generating unit 17 described above, to the post-processing unit 35 of the image processing processor 3.

In the image processing processor 3, the hardware decoder 32 performs decoding processing of the encoded image data supplied from the high-order CPU 1 and supplies the decoding result to the video memory 33. At this time, the decoded image data supplied from the hardware decoder 32 always includes latest frames that are required for display of the corresponding moving pictures, respectively. The reason thereof is that the moving pictures are combined together according to the display timings in the high-order CPU 1. Therefore, in the second embodiment, a special buffer required in the first embodiment is not required.

Meanwhile, the command interpreting unit 36 of the post-processing unit 35 having received the instruction from the high-order CPU 1 interprets the received instruction. At this time, the post-processing unit 35 supplies the information associated with the horizontal resolution included in the original image and combined image information, the information indicating which region in the vertical direction is occupied by each of moving pictures associated with combination and which region is available, and the data size of the original image, which are included in the instruction, to the drawing control unit 37.

The respective-moving-picture separating unit 3121 included in the drawing control unit 37 separates the moving pictures from each other on the basis of the information indicating which region in the vertical direction is occupied by each of moving pictures associated with combination and which region is available. The original-image clipping unit 3122 clips out the original image to restore the image on the basis of the information associated with the horizontal resolution or the vertical resolution included in the original image and combined image information. The original-image clipping unit 3122 supplies the obtained result to the display unit 4 to display each moving picture.

Detailed processing contents of the pre-processing unit 15 and the post-processing unit 35 are explained with reference to FIGS. 12 to 17.

In the high-order CPU 1, a display instruction for moving pictures is issued on the basis of operation processing designed for the image processing device (in the case of a game machine, an operation to design progress of a game in a game machine in which the image processing device is incorporated).

Figure 12:
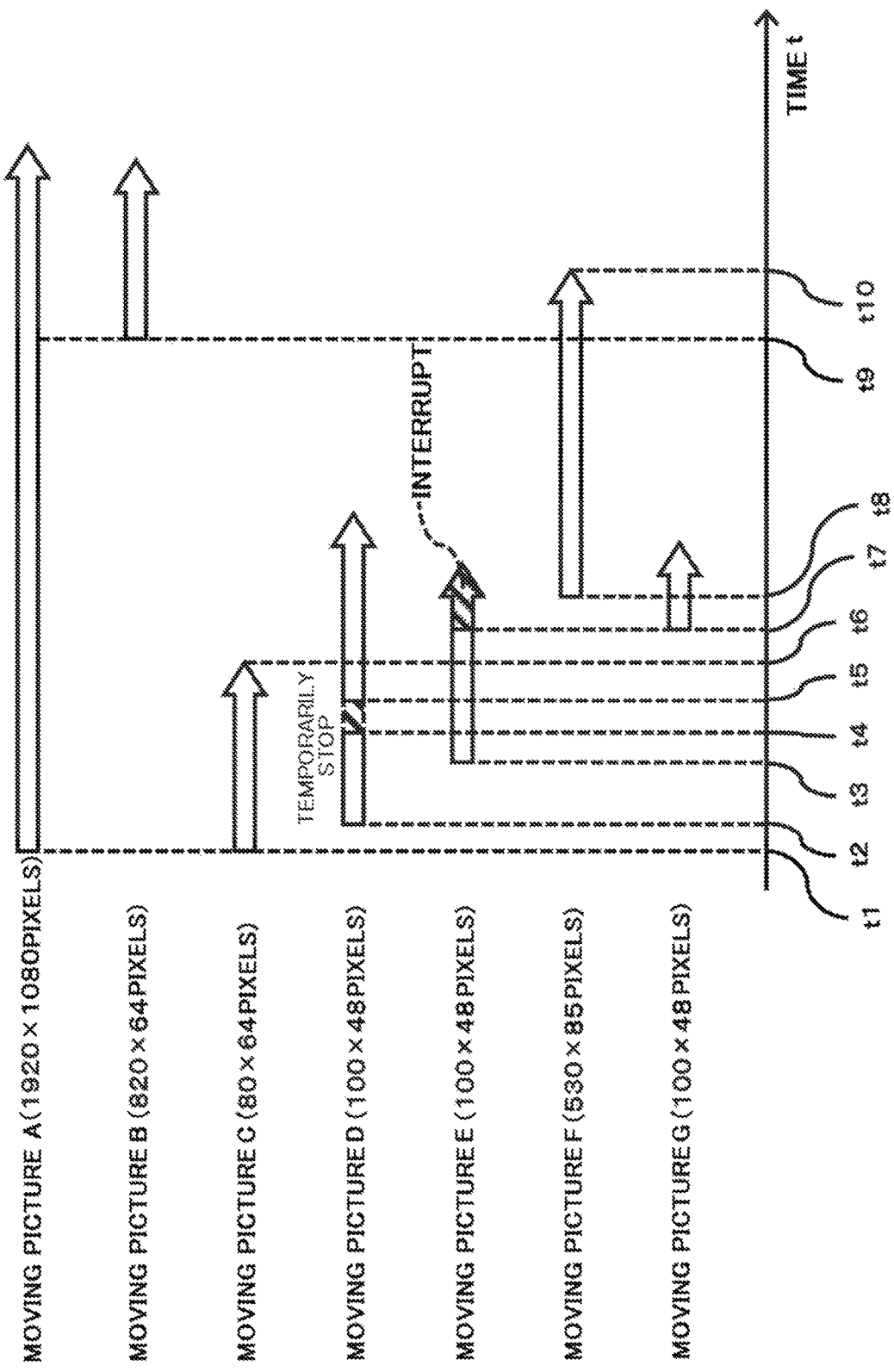
FIG. 12 is a diagram illustrating an example of moving picture reproduction in a game machine such as a pachinko machine or a pachislot machine.
Figure 18:
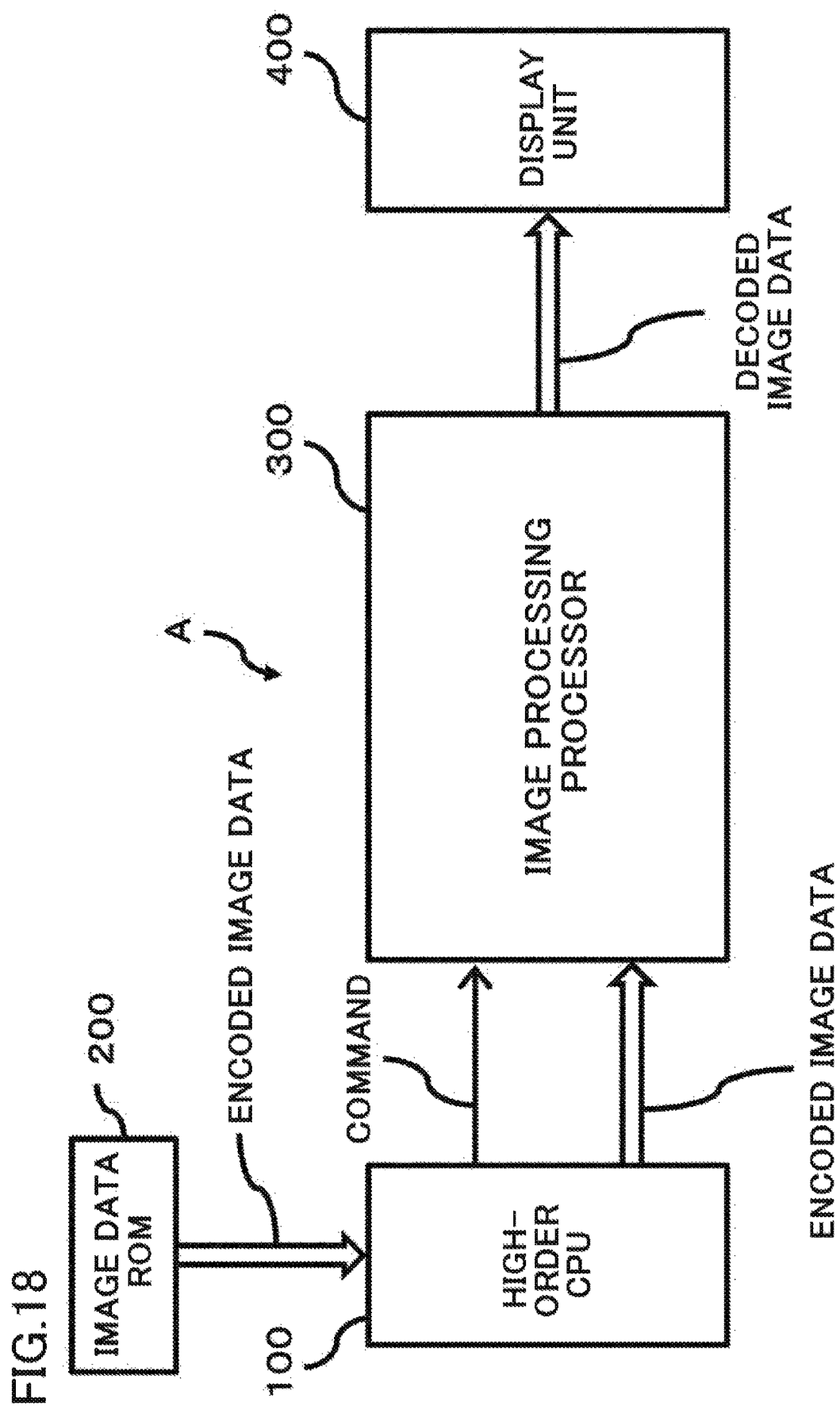
FIG. 18 is a diagram illustrating a configuration of a conventional image processing device.
Figure 19:
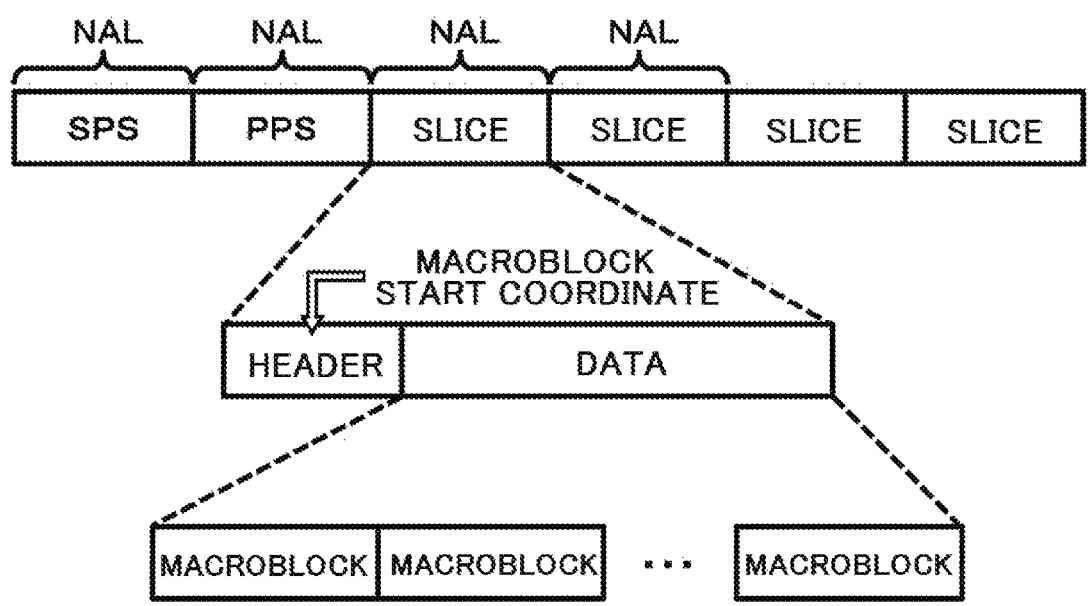
FIG. 19 is a diagram illustrating a general bitstream of encoded data of an image that is encoded on the basis on the H.264 standard.

For example, in an example illustrated in FIG. 12, an instruction to "reproduce the moving picture A", to "separate respective pieces of encoded image data of the moving picture B and the moving picture F, which will be combined and sent, and sequentially reproduce the separated moving pictures", or to "separate respective pieces of encoded image data of the moving pictures C, D, E, and G, which will be combined along with information of a temporary stop or an interruption thereof and sent, and sequentially reproduce the separated moving pictures" is issued in the high-order CPU 1.

The high-order CPU 1 acquires encoded image data from the image data ROM 2 on the basis of the operation processing design. For example, in the case of an instruction to "reproduce the moving picture A", the high-order CPU 1 acquires encoded image data related to the moving picture A from the image data ROM 2 and supplies the acquired data to the hardware decoder 32 of the image processing processor 3. Subsequently, the hardware decoder 32 decodes the encoded image data, stores the decoded image data in the video memory 33, thereafter creates an image using the drawing control unit 37, and supplies the created image to the display unit 4. In this way, the moving picture A is reproduced on the display unit 4.

When the operation processing is reproducing a plurality of moving pictures, for example, the moving pictures C, D, E, and G, the high-order CPU 1 reads encoded image data of necessary moving pictures from the image data ROM 2 and extracts information of the data sizes of original images included in the respective bitstreams of the moving pictures.

The inter-moving-picture respective-picture combining unit 16 first determines the combination image frame described above, subsequently extracts slices constituting a part of the bitstreams of the moving pictures to be combined together, rewrites information of the first macroblock coordinates included in the respective header areas of the slices as necessary, combines a plurality of slices according to the display timings, generates compressed data after combination, and supplies the generated compressed data to the hardware decoder 32 of the image processing processor 3.

Combination of respective pieces of encoded image data with respect to the slices is identical to that in the first embodiment described above (FIG. 7 and explanations thereof). While the GOP configurations need to be the same to match the picture types in the first embodiment, moving pictures can be combined and subjected to decoding processing even when the picture types are different under the conditions described above in the second embodiment. For example, a P picture in the middle of a moving picture can be combined with an I picture at the head of another moving picture.

The inter-moving-picture respective-picture combining unit 16 of the pre-processing unit 15 organizes respective pieces of encoded image data of moving pictures at the slice level as described above to supply the encoded image data to the hardware decoder 32 while combining the moving pictures. At this time, upon reception of the encoded image data, the hardware decoder 32 recognizes that one picture is composed of a plurality of slices (three slices in this example). However, this is within the range of the processing defined by the standard (H.264) and the encoded image data can be subjected as it is to the decoding processing of the hardware decoder 32. The hardware decoder 32 does not recognize that the encoded image data is obtained by combining a plurality of moving pictures.

In other words, this configuration means that any alteration does not need to be added to the hardware decoder 32. That is, also in the second embodiment, pre-processing and post-processing are performed to enable combination and separation of a plurality of moving pictures without adding any alteration to the hardware decoder 32.

In the second embodiment, insertion or replacement of moving pictures to be combined is performed using the combination image frame and moving pictures to be combined are selected according to the display timings. Therefore, there is an unused region in the combination image frame depending on display timings of moving pictures and the unused region needs to be controlled.

A padding slice is used for the unused region or to temporarily stop moving pictures. The padding-slice generating unit 18 generates a necessary padding slice according to the display timing of the relevant moving picture and supplies the generated padding slice to the respective-moving-picture combination-information generating unit 17. A padding slice generated by the padding-slice generating unit 18 is for displaying a previous frame as it is and is a slice configured by temporal direction prediction of acquiring the last frame with no change.

For example, in the H.264 standard, a padding slice is a P slice including all macroblocks (MB) marked as skip. However, in a start frame of combination processing, a padding slice for a deficient region is configured by in-plane coding (intra coding). For example, in the H.264 standard, a padding slice for a deficient region is an IDR slice. A padding slice for a deficient region other than that in the start frame of the combination processing can also be configured by in-plane coding. For example, in the H. 264 standard, this padding slice corresponds to a slice having the slice type of an I picture (hereinafter, "I slice").

Specific processing of the inter-moving-picture respective-picture combining unit 16 is explained with reference to FIGS. 13 to 16 based on an example of respective reproduction timings of moving pictures illustrated in FIG. 12. The SPS and the PPS are omitted in the FIGS. 13 to 16.

Combination processing for the moving picture B and the moving picture F is explained first with reference to FIG. 13. A processing design of combining the moving picture B and the moving picture F to obtain a single bitstream and performing decoding processing thereto is supposed in the inter-moving-picture respective-picture combining unit 16.

In this case, a bitstream obtained after the combination of the inter-moving-picture respective-picture combining unit 16 is composed of at least two or more slices. Specifically, at a time t8 illustrated in FIG. 12, a bitstream after the combination is composed of an I slice of the moving picture F and a padding slice (a slice of an IDR picture) as illustrated in FIG. 13(a). That is, while the moving picture B and the moving picture F are to be combined together and decoded, only the moving picture F is displayed at the time t8 and thus combination processing is performed using the I slice of the moving picture F and a padding slice. Although one padding slice is inserted into the bitstream in the present embodiment, the bitstream can include a plurality of padding slices. When the bitstream thus composed is decoded, a picture configuration in the combination image frame from the time t8 to a time t9 is as illustrated in FIG. 13(b).

Next, at the time t9 illustrated in FIG. 12, the bitstream after the combination is composed of a slice associated with a certain picture in the moving picture F and the I slice of the moving picture B as illustrated in FIG. 13(c). The certain picture does not need to be the I slice and can be a slice having the slice type of a P picture (hereinafter, "P slice"). A picture configuration in the combination image frame from the time t9 to a time t10 is as illustrated in FIG. 13(d).

Next, combination of the moving picture F is canceled at the time t10 illustrated in FIG. 12. Therefore, a padding slice is inserted instead of the slice of the moving picture F and the bitstream after combination is composed of the padding slice and a slice of the moving picture B as illustrated in FIG. 13(e). While an example using one padding slice is cited in the present embodiment, the bitstream can include a plurality of padding slices. A picture configuration in the combination image frame after the time t10 is as illustrated in FIG. 13(f).

The moving picture C, the moving picture D, the moving picture E, and the moving picture G to be combined together by the inter-moving-picture respective-picture combining unit 112 are explained next. In this case, a bitstream after the combination by the inter-moving-picture respective-picture combining unit 112 includes at least two or more slices.

Specifically, at a time t1 in FIG. 12, only the moving picture C is displayed among the moving pictures C, D, E, and G to be combined together and therefore the bitstream after the combination is composed of the I slice of the moving picture C and two padding slices as illustrated in FIG. 14(a). That is, the padding slices are inserted to fill a set combination image frame. Because it is known in this case that the moving picture C, the moving picture D, and the moving picture E will be combined together at the same time, the padding slices are used for portions corresponding to the moving picture D and the moving picture E that are not displayed at the time t1. While an example where a slice is allocated to each moving picture is explained also in the present embodiment, one padding slice can be used to set free regions for the moving picture D and the moving picture E. Alternatively, three or more padding slices can be inserted thereto. That is, because one padding slice can be allocated to continuous regions in the picture configuration, two padding slices can be handled as one padding slice or two padding slices can be further divided. A picture configuration in the combination image frame from the time t1 to a time t2 obtained by decoding this bitstream is as illustrated in FIG. 14(b).

Next, at the time t2 illustrated in FIG. 12, reproduction of the moving picture D is started in addition to reproduction of the moving picture C. Therefore, the bitstream after combination is composed of a slice associated with a certain picture of the moving picture C, the I slice of the moving picture D, and one or more padding slices as illustrated in FIG. 14(c). A picture configuration in the combination image frame from the time t2 to a time t3 is as illustrated in FIG. 14(d). Also in this case, the padding slice can be composed of a plurality of padding slices as described above.

Next, at the time 3 illustrated in FIG. 12, reproduction of the moving picture E is started in addition to the reproduction of the moving picture C and the moving picture D. Therefore, the bitstream after combination is composed of a slice associated with a certain picture of the moving picture C, a slice associated with a certain picture of the moving picture D, and the I slice of the moving picture E as illustrated in FIG. 14(e). A picture configuration in the combination image frame from the time t3 to a time t4 is as illustrated in FIG. 14(f). While the vertical resolution of the combination image frame is matched with the total value of the vertical resolutions of all the moving pictures to be combined together in this example, the vertical resolution of the combination image frame can be defined to a large value in advance.

Next, at the time t4 in FIG. 12, the reproduction of the moving picture D is temporarily stopped while reproduction of the moving picture C and the moving picture E is performed. Therefore, the bitstream after combination is composed of a slice of the moving picture C, a temporary-stop padding slice for the moving picture D, and a slice of the moving picture E as illustrated in FIG. 15(a). At this time, the temporary-stop padding slice generated by the padding-slice generating unit 18 is a padding slice having the same resolution as that of the target moving picture. Therefore, a picture configuration in the combination image frame from the time t4 to a time t5 is as illustrated in FIG. 15(b). At this time, the moving picture D from the time t4 to the time t5 is a repeat of an image at the time t4.

Next, at the time t5 illustrated in FIG. 12, the temporary stop of the moving picture D is canceled and the reproduction of the moving picture C, the moving picture D, and the moving picture E is performed again. Therefore, the bitstream after combination is composed of a slice of the moving picture C, a slice of a reproduction resume image of the moving picture D, and a slice of the moving picture E as illustrated in FIG. 15(c). A picture configuration in the combination image frame from the time t5 to a time t6 is as illustrated in FIG. 15(d).

Next, at the time t6 illustrated in FIG. 12, the reproduction of the moving picture C ends. Therefore, the bitstream after combination is composed of a padding slice, a slice of the moving picture D, and a slice of the moving picture E as illustrated in FIG. 15(e). A picture configuration in the combination image frame from the time t6 to a time t7 is as illustrated in FIG. 15(f). Also in this case, a plurality of slices can be included as described above.

Next, the time t7 illustrated in FIG. 12 is a timing when the reproduction of the moving picture E is interrupted and the moving picture G is reproduced instead. Therefore, the I slice of the moving picture G is inserted instead of a slice of the moving picture E and the bitstream after combination is composed of a padding slice, a slice associated with a certain picture of the moving picture D, and the I slice of the moving picture G as illustrated in FIG. 16(a). A picture configuration in the combination image frame immediately after the time t7 is as illustrated in FIG. 16(b). Because the moving picture E and the moving picture G have the same vertical resolution, the moving picture G is applied as it is to the region of the moving picture E in the picture configuration in the combination image frame immediately after the time t7 illustrated in FIG. 16(b).

However, because the region to which the moving picture C having a larger vertical resolution has been allocated is released as a free region at the time t7, the moving picture G can alternatively be allocated to the region to which the moving picture C has been allocated as illustrated in FIG. 16(b)'. When the moving picture G is thus allocated to the region to which the moving picture C has been allocated, a padding slice corresponding to a free region between the moving picture G and the moving picture D is inserted to adjust a free region in the vertical direction in the combination image frame. Therefore, the bitstream after combination at this time is composed of the I slice of the moving picture G, a padding slice, a slice associated with a certain picture of the moving picture D, and a padding slice as illustrated in FIG. 16(a)'.

A specific example of processing in the post-processing unit 35 is explained next with reference to FIG. 17. As described above, the encoded image data combined according to the display timings are sequentially subjected to decoding processing in the hardware decoder 32 and decoded image data is supplied to the video memory 33.

Meanwhile, in the post-processing unit 35, information associated with the horizontal resolution of the combination image frame, information indicating which regions in the vertical direction of the combination image frame are occupied by moving pictures associated with combination and which regions are unused, and information related to the data size of the original moving picture of each image are sequentially sent from the command interpreting unit 36 to the drawing control unit 37.

The respective-moving-picture separating unit 3121 included in the drawing control unit 37 separates the decoded image data from each other on the basis of the information indicating which regions in the vertical direction are occupied by the moving pictures associated with combination and which regions are unused. For example, the respective-moving-picture separating unit 3121 separates the decoded image data into the moving picture C, the moving picture D, and the moving picture E at any point of time from the time t3 to the time t4 illustrated in FIG. 17(a), as illustrated in the center of FIG. 17(a). The respective-moving-picture separating unit 3121 separates the image data into the moving picture C, a repeat of the image of the moving picture D at the time t4, and the moving picture E at any point of time from the time t4 to the time t5 illustrated in FIG. 17(b), as illustrated in the center of FIG. 17(b). Furthermore, the respective-moving-picture separating unit 3121 separates the image data into the moving picture D and the moving picture E at any point of time from the time t6 to the time t7 illustrated in FIG. 17(c), as illustrated in the center of FIG. 17(c).

Next, the original-image clipping unit 3122 included in the drawing control unit 312 deletes the padding data compensated in the <encoding processing (step S2)> with respect to each frame on the basis of the information associated with the horizontal resolution of the combination image frame and the data size of the original image of each moving picture supplied from the high-order CPU 1, and reconstructs original moving pictures as illustrated on the right parts of FIGS. 17(a), 17(b), and 17(c), respectively. While an example including only three time segments is cited in FIG. 17, other time segments can be readily understood by persons skilled in the art. Respective pieces of data of moving pictures for which the original images are thus reconstructed with respect to each frame are sequentially reproduced on the display unit 4.

As described above, according to the second embodiment of the image data processing method of the present invention, moving pictures having low resolutions in the vertical direction are combined and are subjected to decoding processing at the same time. Therefore, even when parallel processing is performed by a plurality of decoder cores in the vertical direction, the function can be utilized.

Furthermore, the associated processing such as initialization of the decoder is reduced by combination of a plurality of moving pictures to reduce the number of streams to be decoded. Therefore, the processing time is considerably shortened.

According to the second embodiment, slices constituting respective moving pictures are extracted, the plural slices are brought together to generate one piece of encoded image data, so that the moving pictures are combined. Therefore, there is no need to alter the configuration or function of the hardware decoder 32. Furthermore, moving pictures associated with combination are encoded in such a manner that reference buffers in the respective moving pictures are identically managed to prevent the decoding timings and the decoding output timings from differing. Therefore, it is unnecessary to match the picture types at the time of combining the moving pictures at the slice level and the moving pictures can be combined according to the respective display timings.

Summary of Operations and Effects of Aspects of Present Embodiment

<First Aspect>

An image data processing method according to the present invention is an image data processing method using an image processing device that includes a high-order CPU that outputs encoded image data associated with a moving picture and issues an instruction associated with reproduction of the moving picture, an image processing processor that has a hardware decoder and decodes the encoded image data associated with the moving picture on the basis of the instruction to be input, and a display unit on which the moving picture is reproduced on the basis of image data decoded by the image processing processor, wherein in a case where a plurality of moving pictures are reproduced on the display unit on the basis of the instruction, the high-order CPU combines respective moving pictures at a level of slices being encoded image data to integrally configure encoded image data while considering the moving pictures as one picture of a plurality of slices, and supplies the encoded image data to the image processing processor, and the hardware decoder decodes the integrated encoded image data.

Accordingly, when a plurality of moving pictures having low resolutions are to be reproduced, the high-order CPU combines the moving pictures at the slice level and generates encoded image data of one picture composed of a plurality of slices, and the hardware decoder decodes one picture of plural slices including plural moving pictures combined together. Therefore, processing such as initialization of the hardware decoder necessary for each reproduction of moving pictures is rendered unnecessary, and the decoding processing speed can be improved.

<Second Aspect>

According to the image data processing method of the present invention, the high-order CPU requests the image processing processor to separate respective moving pictures from image data integrally decoded by the hardware decoder, and separated moving pictures are reproduced on the display unit. Therefore, a plurality of moving pictures can be reproduced by the same decoding processing and processing such as initialization of the hardware decoder necessary for each reproduction of moving pictures is rendered unnecessary, and the decoding processing speed can be improved.

<Third Aspect>

The high-order CPU extracts original image size information of moving pictures to be combined together from respective pieces of moving picture data and supplies the original image size information to an image processing processor, and the image processing processor separates respective moving pictures from integrally-decoded image data on the basis of the original image size information. Accordingly, even when many moving pictures having low resolutions in the vertical direction are to be reproduced, processing such as initialization of the hardware decoder necessary for each reproduction of moving pictures is rendered unnecessary and, when a hardware decoder having a parallel processing function is used, an advantage of the parallel processing function can be provided.

<Fourth Aspect>

Furthermore, encoded image data obtained by encoding in such a manner that reference buffers are identically managed is used for moving pictures associated with the combining and read by the high-order CPU. This eliminates the need to match picture types of respective slices of the moving pictures associated with the combining and therefore restrictions on reproduction timings of moving picture are reduced.

<Fifth Aspect>

Pieces of encoded image data where the respective decoding timings and the respective decoding output timings do not differ are used and moving pictures are combined at a level of the slices according to timings at which the moving pictures are to be displayed on the display unit. Therefore, restrictions on the reproduction timings of moving pictures are reduced and a data buffer that stores therein decoded image data is not required.

<Sixth Aspect>

When moving pictures are to be combined together at a level of slices according to timings at which the moving pictures are displayed on the display unit, the high-order CPU can also apply a padding slice to time segments other than those associated with display and integrally configure encoded image data while considering the moving pictures as one picture of a plurality of slices including the padding slice. Accordingly, even when the number of reproduced moving pictures falling within a combination image frame is changed, application of a padding slice enables moving pictures to be reproduced without changing the decoding processing. Therefore, processing such as initialization of a hardware decoder is not required and the decoding processing speed can be improved.

<Seventh Aspect>

When combining moving pictures at a level of slices according to timings when the moving pictures are to be displayed on the display unit, the high-order CPU applies the padding slice for a moving picture whose display has been ended at a portion where a slice of the moving pictures has been located. Accordingly, even when the number of reproduced moving pictures falling within the combination image frame is changed, application of a padding slice enables moving pictures to be reproduced without changing the decoding processing. Therefore, processing such as initialization of a hardware decoder is not required and the decoding processing speed can be improved.

Eighth Embodiment

When combining moving pictures at a level of slices according to timings when the moving pictures are to be displayed on the display unit, the high-order CPU repeatedly applies, for a moving picture that is temporarily stopped in the middle of display, a slice that is configured by temporal direction prediction of acquiring the last frame with no change to a period in which the moving picture is temporarily stopped. Accordingly, one decoding processing is continuously performed without changing the format of the encoded image data. Therefore, procedures such as initialization required for the decoding processing can be reduced and the decoding processing speed can be improved.

<Ninth Aspect>

When combining moving pictures at a level of slices according to timings when the moving pictures are to be displayed on the display unit, the high-order CPU ends the padding slice for a moving picture newly displayed and applies a first slice associated with the moving picture newly displayed. Accordingly, one decoding processing can be continuously performed and procedures such as initialization required for the decoding processing can be reduced.

<Tenth Aspect>

Furthermore, the high-order CPU defines a combination image frame associated with a predetermined resolution and causes information about which position in a vertical direction of the combination image frame is occupied by each of moving pictures to be included in an instruction when combining the moving pictures at a level of slices according to timings when the moving pictures are to be displayed on the display unit. Therefore, a necessary portion of moving pictures within the combination image frame can be appropriately clipped.

<Eleventh Aspect>

In the image data processing method of the present invention, for each of moving pictures associated with the combining among the encoded image data associated with the moving pictures, encoded image data obtained by encoding where intervals between GOPs are equal and picture types are matched is used. Accordingly, respective pieces of encoded image data of moving pictures can be combined at the level of slices.

<Twelfth Aspect>

Moving pictures associated with the combining among the encoded image data associated with the moving pictures are encoded with horizontal resolutions thereof matched each other by padding of data in a horizontal direction. Accordingly, encoded image data of a combination of a plurality of moving pictures can be decoded by a single decoder.

<Thirteenth Aspect>

Moving pictures associated with the combining among the encoded image data associated with the moving pictures have vertical resolutions equal to or lower than a predetermined value. Accordingly, encoded image data of a combination of a plurality of moving pictures can be decoded by a single decoder.

<Fourteenth Aspect>

The sum of respective vertical resolutions of moving pictures associated with the combining does not exceed a vertical processing capacity of the hardware decoder. Accordingly, encoded image data of a combination of a plurality of moving pictures can be decoded by a single decoder.

<Fifteenth Aspect>

Moving pictures associated with the combining among the encoded image data associated with the moving pictures are encoded with vertical resolutions thereof matched each other by padding of data in a vertical direction. Therefore, moving pictures to be combined can be easily replaced.

<Sixteenth Aspect>

A plurality of reference values are set for the horizontal resolution and the horizontal resolutions are conformed to one of the reference values to be matched each other. Accordingly, a sorting reference for moving pictures to be combined together is clarified and images associated with combining can be easily selected at the time of representation designing.

<Seventeenth Aspect>

In the image data processing method of the present invention, encoded image data stored in SEI or a container such as MP4 of a bitstream is used. Accordingly, original image size information is extracted when the high-order CPU reads moving pictures, the original image size information can be supplied to the image processing processor, and the image processing processor can delete padding data from decoded data having been subjected to padding processing to extract an image in a desired region.

<Eighteenth Aspect>

The image processing processor accumulates decoded image data obtained from the hardware decoder in an image data storage unit to ensure a desired display timing of each of moving pictures in units of respective frames when the moving pictures are reproduced on the display unit. Accordingly, the moving pictures can be reproduced at desired timings on the basis of moving-picture reproduction timing information.

In any of the aspects described above, even when many moving pictures having low resolutions in the vertical direction are to be reproduced, processing such as initialization of a hardware decoder is rendered unnecessary, a plurality of moving pictures can be reproduced at a high speed, and when a hardware decoder having a parallel processing function is used, an advantage of the parallel processing function can be provided.

In any of the aspects described above, moving pictures are combined in such a manner that plural slices of the moving pictures are brought together in units of pictures. Therefore, it is possible to improve the decoding processing speed without adding any alteration to the configuration or function of the hardware decoder itself.

INDUSTRIAL APPLICABILITY

The image data processing method according to the present invention can be adopted, for example, in a game machine such as a pachinko machine.

REFERENCE SIGNS LIST 1 high-order CPU
11, 15 pre-processing unit
111 respective-moving-picture reproduction-timing-information generating unit
16, 112 inter-moving-picture respective-picture combining unit
17 respective-moving-picture combination-information generating unit
18 padding-slice generating unit
2 image data ROM
3 image processing processor
31, 35 post-processing unit
36, 311 command interpreting unit
37, 312 drawing control unit
3121 respective-moving-picture separating unit
3122 original-image clipping unit
3123 respective-moving-picture display-timing control unit
32 hardware decoder
33 video memory
4 display unit
100 high-order CPU
200 image data ROM
300 image processing processor

The invention claimed is:

1. An image data processing method using an image processing device that includes
a high-order CPU that outputs encoded image data associated with a moving picture and issues an instruction associated with reproduction of the moving picture,
an image processing processor that has a hardware decoder capable of decoding pictures including intra coding slices and inter coding slices and decodes the encoded image data associated with the moving picture on a basis of the instruction to be input, and
a display unit on which the moving picture is reproduced on a basis of image data decoded by the image processing processor, wherein
in a case where a plurality of moving pictures are reproduced on the display unit on a basis of the instruction, the high-order CPU combines respective moving pictures, which are identically managed on reference buffers, at a level of slices, forms an encoded image data comprising a plurality of slices of the moving pictures by encoding the combined moving pictures as one picture, and supplies the encoded image data to the image processing processor, and the hardware decoder decodes the integrated encoded image data,
wherein the high-order CPU is configured to select the moving pictures to be combined based on respective display timings of the moving pictures, and
wherein, when the moving pictures are to be combined together at a level of slices, the high-order CPU applies a padding slice to time segments other than those associated with display and integrally configures encoded image data comprising a plurality of slices including the padding slice as one picture.

2. The image data processing method according to claim 1, wherein, when combining the moving pictures at the level of slices, the high-order CPU ends a second padding slice for a moving picture newly displayed and applies a first slice associated with the moving picture newly displayed.

3. An image data processing method using an image processing device that includes
a high-order CPU that outputs encoded image data associated with a moving picture and issues an instruction associated with reproduction of the moving picture,
an image processing processor that has a hardware decoder capable of decoding pictures including intra coding slices and inter coding slices and decodes the encoded image data associated with the moving picture on a basis of the instruction to be input, and a display unit on which the moving picture is reproduced on a basis of image data decoded by the image processing processor, wherein in a case where a plurality of moving pictures are reproduced on the display unit on a basis of the instruction, the high-order CPU combines respective moving pictures, which are identically managed on reference buffers, at a level of slices, forms an encoded image data comprising a plurality of slices of the moving pictures by encoding the combined moving pictures as one picture, and supplies the encoded image data to the image processing processor, and the hardware decoder decodes the integrated encoded image data, wherein the high-order CPU is configured to select the moving pictures to be combined based on respective display timings of the moving pictures, and wherein, when combining moving pictures at a level of slices, the high-order CPU applies a padding slice to a moving picture, after ending display of the moving picture.

4. The image data processing method according to claim 3, wherein, when combining the moving pictures at the level of slices, the high-order CPU ends a second padding slice for the moving picture newly displayed and applies a first slice associated with the moving picture newly displayed.

5. An image data processing method using an image processing device that includes a high-order CPU that outputs encoded image data associated with a moving picture and issues an instruction associated with reproduction of the moving picture, an image processing processor that has a hardware decoder capable of decoding pictures including intra coding slices and inter coding slices and decodes the encoded image data associated with the moving picture on a basis of the instruction to be input, and a display unit on which the moving picture is reproduced on a basis of image data decoded by the image processing processor, wherein in a case where a plurality of moving pictures are reproduced on the display unit on a basis of the instruction, the high-order CPU combines respective moving pictures, which are identically managed on reference buffers, at a level of slices, forms an encoded image data comprising a plurality of slices of the moving pictures by encoding the combined moving pictures as one picture, and supplies the encoded image data to the image processing processor, and the hardware decoder decodes the integrated encoded image data, wherein the high-order CPU is configured to select the moving pictures to be combined based on respective display timings of the moving pictures, and wherein, when combining the moving pictures at a level of slices, the high-order CPU repeatedly applies, for a moving picture that is temporarily stopped in a middle of display, a slice that is configured by temporal direction prediction of acquiring a last frame with no change to a period in which the moving picture is temporarily stopped.

6. The image data processing method according to claim 5, wherein, when combining the moving pictures at the level of slices, the high-order CPU ends a padding slice for the moving picture newly displayed and applies a first slice associated with the moving picture newly displayed.

\* \* \* \* \*